US012581522B2

(12) United States Patent
Fei et al.

(10) Patent No.: US 12,581,522 B2
(45) Date of Patent: Mar. 17, 2026

(54) COMMUNICATION METHOD AND APPARATUS, AND STORAGE MEDIUM

(71) Applicant: Huawei Technologies Co., Ltd., Shenzhen (CN)

(72) Inventors: Yongqiang Fei, Shenzhen (CN); Juan Zheng, Beijing (CN); Hailong Hou, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 589 days.

(21) Appl. No.: 18/055,097

(22) Filed: Nov. 14, 2022

(65) Prior Publication Data
US 2023/0076257 A1       Mar. 9, 2023

Related U.S. Application Data

(63) Continuation of application No. PCT/CN2021/092866, filed on May 10, 2021.

(30) Foreign Application Priority Data

May 15, 2020       (CN) .......................... 202010412309.7

(51) Int. Cl.
| | |
|---|---|
| *H04W 72/232* | (2023.01) |
| *H04W 72/1268* | (2023.01) |
| *H04W 72/23* | (2023.01) |
| *H04W 72/52* | (2023.01) |

(52) U.S. Cl.
CPC ....... *H04W 72/52* (2023.01); *H04W 72/1268* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 12,279,275 B2 * | 4/2025 | Xu ........................ | H04W 72/23 |
| 2019/0349142 A1 | 11/2019 | Aiba et al. | |
| 2019/0373588 A1 | 12/2019 | Bae et al. | |

(Continued)

FOREIGN PATENT DOCUMENTS

| | | |
|---|---|---|
| CN | 105577317 A | 5/2016 |
| CN | 108633070 A | 10/2018 |

(Continued)

OTHER PUBLICATIONS

AT&T, "Design considerations for NR operation with wide bandwidths", 3GPP TSG RAN WG1 Meeting #89, R1-1707735, Hangzhou, P.R. China, May 15-19, 2017, 4 pages.

(Continued)

*Primary Examiner* — Duc T Duong
(74) *Attorney, Agent, or Firm* — Slater Matsil, LLP

(57) ABSTRACT

A terminal device receives first information from a network device, where the first information indicates transmission direction information and/or service load information. The terminal device receives downlink control information DCI from the network device based on the first information. The network device may configure a DCI transmission mode by using the first information based on a characteristic of a to-be-transmitted service of the terminal device.

19 Claims, 11 Drawing Sheets

(56) References Cited

U.S. PATENT DOCUMENTS

| | | | | |
|---|---|---|---|---|
| 2020/0187172 A1* | 6/2020 | Wang | ................... | H04B 7/0617 |
| 2021/0152274 A1* | 5/2021 | Yang | ..................... | H04L 5/0091 |
| 2021/0153208 A1 | 5/2021 | Li et al. | | |
| 2021/0185595 A1* | 6/2021 | Zhu | ........................ | H04W 48/12 |
| 2021/0211237 A1* | 7/2021 | Yang | ..................... | H04W 72/23 |
| 2021/0243758 A1* | 8/2021 | Ji | .......................... | H04L 5/0044 |
| 2022/0046662 A1* | 2/2022 | Takeda | .............. | H04W 72/1263 |
| 2023/0042801 A1* | 2/2023 | Ji | ......................... | H04W 28/06 |
| 2023/0062788 A1* | 3/2023 | Wei | ........................ | H04L 5/0044 |
| 2023/0073247 A1* | 3/2023 | Prasad | .................. | H04W 72/52 |
| 2023/0224930 A1* | 7/2023 | Huang | ...................... | H04L 1/08 370/312 |
| 2023/0261839 A1* | 8/2023 | Ben Hadj Fredj | .... | H04W 72/23 370/329 |

FOREIGN PATENT DOCUMENTS

| | | |
|---|---|---|
| CN | 110876185 A | 3/2020 |
| WO | 2017101011 A1 | 6/2017 |
| WO | 2020019258 A1 | 1/2020 |

OTHER PUBLICATIONS

Panasonic, "Signalling design on supporting SPS for slidelink transmission mode 3", 3GPP TSG RAN WG1 Meeting #86bis, R1-1609570, Oct. 10-14, 2016, 2 Pages, Lisbon, Portugal.

Vivo, "Maintenance of PDCCH-based power saving signal", 3GPP TSG RAN WG1 #100, R1-2000337, Feb. 24-Mar. 6, 2020, 18 Pages, E-Meeting.

3GPP TSG RAN WG1 #99 R1-1912838, "Mechanisms for supporting access and backhaul link multiplexing", AT&T, Reno, NV, Nov. 18-22, 2019, total 8 pages.

3GPP TSG RAN WG1 Meeting #99 R1-1912349, "Discussion on delay-tolerant HARQ for NTN", Sony, Reno, USA, Nov. 18-22, 2019, total 6 pages.

3GPP TSG-RAN WG1 Meeting #100bis R1-2001784, "Remaining Issue of PDCCH Enhancements for NR URLLC", Ericsson, e-Meeting, Apr. 20-30, 2020, total 21 pages.

* cited by examiner

COMMUNICATION METHOD AND APPARATUS, AND STORAGE MEDIUM

CROSS-REFERENCE TO RELATED APPLICATIONS

This application is a continuation of International Application No. PCT/CN2021/092866, filed on May 10, 2021, which claims priority to Chinese Patent Application No. 202010412309.7, filed on May 15, 2020. The disclosures of the aforementioned applications are hereby incorporated by reference in their entireties.

TECHNICAL FIELD

This application relates to the field of mobile communication technologies, and in particular, to a communication method and apparatus, and a storage medium.

BACKGROUND

In new radio (NR) systems, information exchanged between a network device and a terminal device is carried on a physical channel. Data sent by the network device is usually carried on a physical downlink shared channel (PDSCH), and the PDSCH is usually scheduled by using downlink control information (DCI) carried on a physical downlink control channel (PDCCH). Correspondingly, the terminal device determines a frequency domain range for transmission with the network device based on a preconfigured bandwidth part, receives DCI from the network device based on a control resource set (CORESET) and search space (SS) in the BWP, and further receives service data scheduled by using the DCI. Similarly, the network device also schedules, by using DCI, the terminal device to send data, and the data sent by the terminal device is usually carried on a physical uplink shared channel (PUSCH). The network device may send DCI in different formats to schedule the terminal device. Therefore, the terminal device needs to detect the DCI in the different formats. For example, a format of DCI for scheduling a PUSCH is different from a format of DCI for scheduling a PDSCH, or a format of predefined DCI is different from a format of DCI based on a terminal-specific configuration. The DCI in the different formats usually has different sizes. A larger amount of DCI in different sizes that needs to be detected by the terminal device causes higher complexity, higher energy consumption, and lower efficiency of DCI detection.

Currently, vertical industries are increasingly mature, and communication services with high rates, low latencies, and large connections are increasing. To meet increasingly high transmission requirements of the communication services, how to improve communication efficiency and reduce energy consumption of the terminal device becomes a technical problem that urgently needs to be resolved.

SUMMARY

Embodiments of this application provide a communication method and apparatus, and a storage medium, to reduce complexity of detecting DCI by a terminal device in a communication process, improve DCI detection efficiency, reduce energy consumption of a network device and the terminal device, and improve communication efficiency and resource utilization.

According to a first aspect, a communication method is provided. The method includes: receiving first information from a network device, where the first information indicates transmission direction information and/or service load information; and receiving downlink control information DCI from the network device based on the first information.

The method may be performed by a first communication apparatus. The first communication apparatus may be a communication device or a communication apparatus, for example, a chip, that can support the communication device in implementing a function required in the method. For example, the first communication apparatus is a terminal device, a chip that is disposed in the terminal device and that is configured to implement a function of the terminal device, or another component configured to implement the function of the terminal device. In the following description process, an example in which the first communication apparatus is the terminal device is used.

The terminal device receives the first information of the network device, and further determines the transmission direction information and/or the service load information. The terminal device may adjust a receiving manner of the DCI by using the first information, to transmit the DCI based on a characteristic of a to-be-transmitted service, thereby reducing consumption of blind detection on the DCI while meeting a service requirement.

In an optional implementation, the transmission direction information indicates at least one of the following: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission.

Based on the transmission direction indication information, the network device may indicate a size alignment manner of the DCI in the first format and/or the DCI in the second format or indicate whether the DCI in the first format and/or the DCI in the second format are/is detected, so that the terminal device adjusts a manner of receiving the DCI in the first format and/or the DCI in the second format, to simplify DCI blind detection complexity. In addition, the terminal device may determine, based on the default transmission direction state, to restore to normal DCI transmission, to be applicable to services with different transmission characteristics.

In an optional implementation, alignment methods include zero padding and truncation.

In an optional implementation, when the first information indicates the second transmission direction state, the DCI in the first format does not include a DCI format indicator field; and/or when the first information indicates the fourth transmission direction state, the DCI in the second format does not include a DCI format indicator field.

When the to-be-transmitted service includes only an uplink service or only a downlink service, the terminal device may detect only the DCI in the first format or only the DCI in the second format. In this case, the terminal device detects only DCI in one format, and a field for originally indicating a DCI format may be omitted or reused, to reduce indication overheads, reduce DCI payloads, and improve DCI transmission reliability.

In an optional implementation, the service load information indicates at least one of the following: a first load state, indicating that service load of the terminal device is heavy load; and a second load state, indicating that service load of the terminal device is light load.

The service load information may indicate a size of a to-be-transmitted service volume of the terminal device.

In an optional implementation, when the terminal device is in the first load state, the terminal device detects only first-type DCI, or detects the first-type DCI in search space corresponding to second-type DCI; and/or when the terminal device is in the second load state, the terminal device detects only the second-type DCI, or detects the second-type DCI in search space corresponding to the first-type DCI; and/or when the terminal device is in a default load state, the terminal device detects the first-type DCI in the search space corresponding to the first-type DCI, and/or detects the second-type DCI in the search space corresponding to the second-type DCI, where the first-type DCI and the second-type DCI are in different formats, and an indicator field included in the second-type DCI and a size of the indicator field are predefined.

The terminal device may determine, based on the service load information, to detect the first-type DCI and/or the second-type DCI. The service load information indicates the size of the to-be-transmitted service volume of the terminal device. In other words, the first load state may be understood as that the terminal device and the network device may detect the first-type DCI in candidate search space when the to-be-transmitted service volume of the terminal device is large, where the candidate search space is, for example, the search space of the second-type DCI, to improve a transmission rate and optimize user experience. The second load state may be understood as that the network device may increase a periodicity of search space to enable the terminal device to reduce frequency of blindly detecting the DCI, or avoid unnecessary detection on the first-type DCI when the to-be-transmitted service volume of the terminal device is small, to save communication resources and reduce energy consumption of the terminal device. The default load state indicates to restore an original transmission state. The network device can improve DCI scheduling performance based on the first information without performing SS reconfiguration on the terminal device, and schedule the terminal device to transmit a larger TB on more PDCCH detection occasions. This meets a transmission requirement of the terminal device in a heavy-load state, improves user experience, and reduces signaling consumption of SS reconfiguration performed by the network device. In addition, when the to-be-transmitted service volume is not large, the network device may still flexibly schedule the terminal device by using the first-type DCI. This helps cope with an unexpected service, and reduces power consumption and signaling overheads of SS reconfiguration performed by the network device.

In an optional implementation, the receiving DCI from the network device based on the first information includes: receiving the DCI from the network device based on the first information within valid time.

The valid time of the first information is limited, so that the first information that becomes valid in different time periods can be configured based on the characteristic of the to-be-transmitted service, to adjust a DCI transmission mode more flexibly.

In an optional implementation, the valid time is determined based on valid time indication information from the network device.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the method further includes: sending transmission characteristic information to the network device, where the transmission characteristic information indicates the characteristic of the to-be-transmitted service of the terminal device.

In an optional implementation, the first information is carried in a radio resource control RRC message, or carried in a media access control control element MAC CE.

The terminal device may report the characteristic of the to-be-transmitted service by sending the transmission characteristic information to the network device, so that the network device determines the first information based on a subsequent service transmission characteristic of the terminal device, to better improve user experience.

In an optional implementation, the first information further indicates a use manner of an SPS resource.

It may be understood that, the first information indicates a manner in which the terminal device detects the DCI, and also indicates to the terminal device to use or release of the SPS resource, or the terminal device determines the use manner of the SPS resource based on a transmission direction state and/or a service load state that are/is indicated by the first information. The first information indicates use of the SPS resource, so that the terminal device can better use the SPS resource based on the characteristic of the to-be-transmitted service, to reduce system consumption.

In an optional implementation, the terminal device may determine the transmission direction information, the service load information, and SPS resource use information based on the first information, to maximize utilization of an indication message.

According to a second aspect, a second communication method is provided. The method includes: sending first information to a terminal device, where the first information indicates transmission direction information and/or service load information; and sending downlink control information DCI to the terminal device.

The method may be performed by a second communication apparatus. The second communication apparatus may be a communication device or a communication apparatus, for example, a chip, that can support the communication device in implementing a function required in the method. For example, the second communication apparatus is a network device, a chip that is disposed in the network device and that is configured to implement a function of the network device, or another component configured to implement the function of the network device. In the following description process, an example in which the second communication apparatus is the network device is used.

The network device may indicate the transmission direction information and/or the service load information to the terminal device by using the first information, and send DCI to the terminal device based on a DCI transmission mode indicated by the first information. The network device may adjust the DCI transmission mode by using the first information based on the characteristic of the to-be-transmitted service, to improve user experience and reduce DCI transmission consumption.

In an optional implementation, the transmission direction information indicates at least one of the following: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission.

Based on the transmission direction indication information, the network device may indicate a size alignment manner of the DCI in the first format and/or the DCI in the second format or indicate whether the DCI in the first format and/or the DCI in the second format are/is detected, and further adjust a transmission mode of the DCI in the first format and/or the DCI in the second format, to simplify DCI blind detection complexity. In addition, the default transmission direction state may indicate the terminal device to restore to normal DCI transmission, to be applicable to services with different transmission characteristics.

In an optional implementation, alignment methods include zero padding and truncation.

In an optional implementation, when the first information indicates the second transmission direction state, the DCI in the first format does not include a DCI format indicator field; and/or when the first information indicates the fourth transmission direction state, the DCI in the second format does not include a DCI format indicator field.

When the to-be-transmitted service includes only an uplink service or only a downlink service, the network device may send only the DCI in the first format or only the DCI in the second format. In this case, the network device transmits only DCI in one format, and a field for originally indicating a DCI format may be omitted or reused, to reduce indication overheads, reduce DCI payloads, and improve DCI transmission reliability.

In an optional implementation, the service load information indicates at least one of the following: a first load state, indicating that service load of the terminal device is heavy load; and a second load state, indicating that service load of the terminal device is light load.

The service load information may indicate a size of a to-be-transmitted service volume of the terminal device.

In an optional implementation, when the first information indicates the first load state, the network device sends only first-type DCI, or sends the first-type DCI in search space corresponding to second-type DCI; and/or when the first information indicates the second load state, the network device sends only the second-type DCI, or sends the second-type DCI in search space corresponding to the first-type DCI; and/or when the first information indicates a default load state, the network device sends the first-type DCI in the search space corresponding to the first-type DCI, and/or sends the second-type DCI in the search space corresponding to the second-type DCI, where the first-type DCI and the second-type DCI are in different formats, and an indicator field included in the second-type DCI and a size of the indicator field are predefined.

The network device may indicate a transmission mode of the first-type DCI and/or the second-type DCI based on the service load information. The service load information indicates the size of the to-be-transmitted service volume of the terminal device. In other words, the first load state may be understood as that the terminal device and the network device may detect the first-type DCI in candidate search space when the to-be-transmitted service volume of the terminal device is large, where the candidate search space is, for example, the search space of the second-type DCI, to improve a transmission rate and optimize user experience. The second load state may be understood as that the network device may increase a periodicity of search space to enable the terminal device to reduce frequency of blindly detecting the DCI, or avoid unnecessary detection on the first-type DCI when the to-be-transmitted service volume of the terminal device is small, to save communication resources and reduce energy consumption of the terminal device. The default load state indicates to restore to an original transmission state. The network device can improve DCI scheduling performance based on the first information without performing SS reconfiguration on the terminal device, and schedule the terminal device to transmit a larger TB on more PDCCH detection occasions. This meets a transmission requirement of the terminal device in a heavy-load state, improves user experience, and reduces signaling consumption of SS reconfiguration performed by the network device. In addition, when the to-be-transmitted service volume is not large, the network device may still flexibly schedule the terminal device by using the first-type DCI. This helps cope with an unexpected service, and reduces power consumption and signaling overheads of SS reconfiguration performed by the network device.

In an optional implementation, the sending downlink control information DCI to the terminal device includes: sending the downlink control information DCI to the terminal device within valid time.

The valid time of the first information is limited, so that the first information that becomes valid in different time periods can be configured based on the characteristic of the to-be-transmitted service, to adjust a DCI transmission mode more flexibly.

In an optional implementation, the valid time is determined based on valid time indication information from the network device.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the method further includes: receiving transmission characteristic information from the terminal device, where the transmission characteristic information indicates the characteristic of the to-be-transmitted service of the terminal device.

In an optional implementation, the first information is carried in a radio resource control RRC message, or carried in a media access control control element MAC CE.

The network device may determine the characteristic of the to-be-transmitted service by receiving the transmission characteristic information from the terminal device, and further determine the first information, to better improve user experience.

In an optional implementation, the first information further indicates a use manner of an SPS resource.

It may be understood that, the first information indicates a manner in which the terminal device detects the DCI, and also indicates to the terminal device to use or release of the SPS resource, or the network device indicates, by using the first information, a manner in which the terminal device uses the SPS resource. The first information indicates use of the SPS resource, so that signaling overheads for the network device to indicate, by using the DCI or an RRC reconfiguration message, the terminal device to release the resource can be reduced, and system consumption can be reduced.

In an optional implementation, the network device may indicate all of the transmission direction information, the service load information, and SPS resource use information based on the first information, to maximize utilization of an indication message.

According to a third aspect, a third communication method is provided. The method includes: receiving second information from a network device, where the second information indicates a use manner of an SPS resource; and performing transmission based on the second information by using the SPS resource.

The method may be performed by a third communication apparatus. The third communication apparatus may be a communication device or a communication apparatus, for example, a chip, that can support the communication device in implementing a function required in the method. For example, the third communication apparatus is a terminal device, a chip that is disposed in the terminal device and that is configured to implement a function of the terminal device, or another component configured to implement the function of the terminal device. In the following description process, an example in which the third communication apparatus is the terminal device is used.

The SPS resource is a periodic resource. When the SPS resource is valid, the terminal device only needs to perform transmission based on a configuration of higher layer signaling by using the SPS resource, and does not require DCI scheduling. SPS transmission may be used for low-latency transmission or long-term and continuous transmission based on a scheduling-free characteristic of the SPS resource, to improve communication efficiency. The network device may determine, based on a characteristic of a to-be-transmitted service of the terminal device, whether to indicate the terminal device to release a specific type of SPS resource or release all SPS resources, to release more resources to another terminal device, thereby implementing flexible scheduling in a communication system.

In an optional implementation, the second information may indicate at least one of the following: first indication information, indicating the terminal device to release, deactivate, or skip using a DL SPS resource; second indication information, indicating the terminal device to release, deactivate, or skip using a UL configured grant resource; third indication information, indicating the terminal device to release, deactivate, or skip using the DL SPS resource and the UL configured grant resource; and default indication information, indicating the terminal device to activate or use the DL SPS resource and the UL configured grant resource.

In an optional implementation, the second information is determined based on the characteristic of the to-be-transmitted service of the terminal device. The "release or skip using" may be understood as deactivating or releasing a resource. The SPS resource is a periodic transmission resource configured by the network device for the terminal device. When the network device determines that data is not transmitted by using the DL SPS resource in a next period of time, the terminal device does not need to receive downlink data by using the DL SPS resource either. Therefore, the DL SPS resource can be released to save a transmission resource of a downlink control channel. Releasing a resource may also be understood as skip using the resource for transmission. Similarly, the network device may indicate, based on the characteristic of the to-be-transmitted service of the terminal device, the terminal device to release or deactivate the UL configured grant resource, to improve overall resource utilization of the communication system.

In an optional implementation, the method further includes: receiving a transmission characteristic request from the network device, where the transmission characteristic request indicates the terminal device to report the transmission characteristic information.

In an optional implementation, the method further includes: sending the transmission characteristic information to the network device, where the transmission characteristic information indicates the characteristic of the to-be-transmitted service of the terminal device.

The network device and the terminal device may exchange the characteristic information of the to-be-transmitted service of the terminal device, so that the network device can optimize the use manner of the SPS resource more accurately based on the service characteristic, to improve resource utilization of the communication system.

In an optional implementation, the method further includes: determining valid time of the second information.

In an optional implementation, the method further includes: receiving valid time indication information from the network device. A correspondence between the valid time indication information and the second information may be in a one-to-one correspondence, or may be in a one-to-many correspondence.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the second information is carried in a radio resource control RRC message, or carried in a media access control control element MAC CE.

According to the communication method provided in this embodiment of this application, the terminal device may determine an SPS resource transmission method based on the second information, to improve resource utilization. The network device may send first information and the second information to the terminal device based on the to-be-transmitted characteristic of the terminal device. Further, valid time of the first information and/or the valid time of the second information may be configured by using the valid time indication information, to flexibly control communication transmission of the terminal device based on the service characteristic, optimize user experience, and improve resource utilization of the communication system.

According to a fourth aspect, a fourth communication method is provided. The method includes: sending second information to a terminal device, where the second information indicates a use manner of an SPS resource; and performing transmission based on the second information by using the SPS resource.

The method may be performed by a fourth communication apparatus. The fourth communication apparatus may be a communication device or a communication apparatus, for example, a chip, that can support the communication device in implementing a function required in the method. For example, the fourth communication apparatus is a network device, a chip that is disposed in the network device and that is configured to implement a function of the network device, or another component configured to implement the function of the network device. In the following description process, an example in which the fourth communication apparatus is the network device is used.

The SPS resource is a periodic resource. When the SPS resource is valid, the network device only needs to configure a transmission mode of the SPS resource by using higher layer signaling, and does not require DCI scheduling. SPS transmission may be used for low-latency transmission or long-term and continuous transmission based on a scheduling-free characteristic of the SPS resource, to improve communication efficiency. The network device may determine, based on a characteristic of a to-be-transmitted service of the terminal device, whether to indicate the terminal device to release a specific type of SPS resource or release all SPS resources, to release more resources to another terminal device, thereby implementing flexible scheduling in a communication system.

In an optional implementation, the second information may indicate at least one of the following: first indication information, indicating the terminal device to release, deactivate, or skip using a DL SPS resource; second indication information, indicating the terminal device to release, deactivate, or skip using a UL configured grant resource; third indication information, indicating the terminal device to release, deactivate, or skip using the DL SPS resource and the UL configured grant resource; and default indication information, indicating the terminal device to activate or use the DL SPS resource and the UL configured grant resource.

In an optional implementation, the second information is determined based on the characteristic of the to-be-transmitted service of the terminal device. The "release or skip using" may be understood as deactivating or releasing a resource. The SPS resource is a periodic transmission resource configured by the network device for the terminal device. When the network device determines that data is not transmitted by using the DL SPS resource in a next period of time, the terminal device does not need to receive downlink data by using the DL SPS resource either. Therefore, the DL SPS resource can be released to save a transmission resource of a downlink control channel. Releasing a resource may also be understood as skip using the resource for transmission. Similarly, the network device may indicate, based on the characteristic of the to-be-transmitted service of the terminal device, the terminal device to release or deactivate the UL configured grant resource, to improve overall resource utilization of the communication system.

In an optional implementation, the method further includes: sending a transmission characteristic request to the terminal device, where the transmission characteristic request indicates the terminal device to report transmission characteristic information.

In an optional implementation, the method further includes: receiving transmission characteristic information from the terminal device, where the transmission characteristic information indicates the characteristic of the to-be-transmitted service of the terminal device.

The network device and the terminal device may exchange the characteristic information of the to-be-transmitted service of the terminal device, so that the network device can optimize the use manner of the SPS resource more accurately based on the service characteristic, to improve resource utilization of the communication system.

In an optional implementation, the method further includes: determining valid time of the second information.

In an optional implementation, the method further includes: sending valid time indication information to the terminal device. A correspondence between the valid time indication information and the second information may be in a one-to-one correspondence, or may be in a one-to-many correspondence.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the second information is carried in a radio resource control RRC message, or carried in a media access control control element MAC CE.

According to the communication method provided in this embodiment of this application, the network device may indicate an SPS resource use method to the terminal device by using the second information, to improve resource utilization. The network device may send first information and the second information to the terminal device based on the to-be-transmitted characteristic of the terminal device. Further, valid time of the first information and/or the valid time of the second information may be configured by using the valid time indication information, to flexibly control communication transmission of the terminal device based on the service characteristic, optimize user experience, and improve resource utilization of the communication system.

According to a fifth aspect, a communication apparatus is provided. The communication apparatus is, for example, the first communication apparatus described above. The first communication apparatus is configured to perform the method according to any one of the first aspect or the possible implementations. Specifically, the first communication apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module but can implement different functions. For example, the first communication apparatus is a communication device, or is a chip or another component disposed in the communication device. For example, the communication device is a network device. The following uses an example in which the first communication apparatus is the terminal device. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module but can implement different functions. For example, if the first communication apparatus is the communication device, the transceiver is implemented as an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the fifth aspect, the processing module, the transceiver module, and a case in which the first communication apparatus is the terminal device are still used as examples for description.

The transceiver module receives first information from a network device, where the first information indicates transmission direction information and/or service load information.

The processing module is configured to receive downlink control information DCI from the network device based on the first information through the transceiver module.

In an optional implementation, the transmission direction information indicates at least one of the following: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission.

In an optional implementation, alignment methods include zero padding and truncation.

In an optional implementation, when the first information indicates the second transmission direction state, the DCI in the first format does not include a DCI format indicator field; and/or when the first information indicates the fourth transmission direction state, the DCI in the second format does not include a DCI format indicator field.

In an optional implementation, the service load information indicates at least one of the following: a first load state, indicating that service load of the terminal device is heavy load; and a second load state, indicating that service load of the terminal device is light load.

The service load information may indicate a size of a to-be-transmitted service volume of the terminal device.

In an optional implementation, when the communication apparatus is in the first load state, the transceiver module detects only first-type DCI, or detects the first-type DCI in search space corresponding to second-type DCI; and/or when the communication apparatus is in the second load state, the transceiver module detects only the second-type DCI, or detects the second-type DCI in search space corresponding to the first-type DCI; and/or when the communication apparatus is in a default load state, the transceiver module detects the first-type DCI in the search space corresponding to the first-type DCI, and/or detects the second-type DCI in the search space corresponding to the second-type DCI, where the first-type DCI and the second-type DCI are in different formats, and an indicator field included in the second-type DCI and a size of the indicator field are predefined.

In an optional implementation, the transceiver module is configured to receive the DCI from the network device based on the first information within valid time.

In an optional implementation, the valid time is determined based on valid time indication information from the network device.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the transceiver module is further configured to send transmission characteristic information to the network device, where the transmission characteristic information indicates a characteristic of a to-be-transmitted service of the terminal device.

In an optional implementation, the first information is carried in a radio resource control RRC message, or carried in a media access control control element MAC CE.

In an optional implementation, the first information further indicates a use manner of an SPS resource.

In an optional implementation, the processing module may determine the transmission direction information, the service load information, and SPS resource use information based on the first information, to maximize utilization of an indication message.

For technical effects brought by the fifth aspect or the optional implementations, refer to descriptions of the technical effects brought by the first aspect or the corresponding implementations.

According to a sixth aspect, a communication apparatus is provided. The communication apparatus is, for example, the second communication apparatus described above. The second communication apparatus is configured to perform the method according to any one of the second aspect or the possible implementations. Specifically, the second communication apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module but can implement different functions. For example, the second communication apparatus is a communication device, or is a chip or another component disposed in the communication device. For example, the communication device is a network device. The following uses an example in which the second communication apparatus is the network device. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module but can implement different functions. For example, if the second communication apparatus is the communication device, the transceiver is implemented as an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the sixth aspect, the processing module, the transceiver module, and a case in which the second communication apparatus is the terminal device are still used as examples for description.

The transceiver module sends first information to a terminal device, where the first information indicates transmission direction information and/or service load information.

The transceiver module is further configured to send downlink control information DCI to the terminal device.

In an optional implementation, the processing module is configured to determine the first information.

In an optional implementation, the transmission direction information indicates at least one of the following: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission.

In an optional implementation, alignment methods include zero padding and truncation.

In an optional implementation, when the first information indicates the second transmission direction state, the DCI in the first format does not include a DCI format indicator field; and/or when the first information indicates the fourth transmission direction state, the DCI in the second format does not include a DCI format indicator field.

In an optional implementation, the service load information indicates at least one of the following: a first load state, indicating that service load of the terminal device is heavy load; and a second load state, indicating that service load of the terminal device is light load.

In an optional implementation, when the first information indicates the first load state, the transceiver module sends only first-type DCI, or sends the first-type DCI in search space corresponding to second-type DCI; and/or when the first information indicates the second load state, the transceiver module sends only the second-type DCI, or sends the second-type DCI in search space corresponding to the first-type DCI; and/or when the first information indicates a default load state, the transceiver module sends the first-type DCI in the search space corresponding to the first-type DCI, and/or sends the second-type DCI in the search space corresponding to the second-type DCI, where the first-type DCI and the second-type DCI are in different formats, and an indicator field included in the second-type DCI and a size of the indicator field are predefined.

In an optional implementation, the sending downlink control information DCI to the terminal device includes: sending the downlink control information DCI to the terminal device within valid time.

In an optional implementation, the valid time is determined based on valid time indication information from the network device.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the method further includes: receiving transmission characteristic information from the terminal device, where the transmission characteristic information indicates a characteristic of a to-be-transmitted service of the terminal device.

In an optional implementation, the first information is carried in a radio resource control RRC message, or carried in a media access control control element MAC CE.

In an optional implementation, the first information further indicates a use manner of an SPS resource.

For technical effects brought by the sixth aspect or the optional implementations, refer to descriptions of the technical effects brought by the second aspect or the corresponding implementations.

According to a seventh aspect, a communication apparatus is provided. The communication apparatus is, for example, the third communication apparatus described above. The third communication apparatus is configured to perform the method according to any one of the third aspect or the possible implementations. Specifically, the third communication apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module but can implement different functions. For example, the third communication apparatus is a communication device, or is a chip or another component disposed in the communication device. For example, the communication device is a terminal device. The following uses an example in which the third communication apparatus is the terminal device. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module but can implement different functions. For example, if the third communication apparatus is the communication device, the transceiver is implemented as an antenna, a feeder, and a codec in the communication device. Alternatively, if the third communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the seventh aspect, the processing module, the transceiver module, and a case in which the third communication apparatus is the terminal device are still used as examples for description.

The transceiver module is configured to receive second information from a network device, where the second information indicates a use manner of an SPS resource.

The processing module is configured to perform transmission through the transceiver module based on the second information by using the SPS resource.

In an optional implementation, the second information may indicate at least one of the following: first indication information, indicating the terminal device to release, deactivate, or skip using a DL SPS resource; second indication information, indicating the terminal device to release, deactivate, or skip using a UL configured grant resource; third indication information, indicating the terminal device to release, deactivate, or skip using the DL SPS resource and the UL configured grant resource; and default indication information, indicating the terminal device to activate or use the DL SPS resource and the UL configured grant resource.

In an optional implementation, the second information is determined based on a characteristic of a to-be-transmitted service of the terminal device.

In an optional implementation, the transceiver module is further configured to receive a transmission characteristic request from a network device, where the transmission characteristic request indicates the terminal device to report transmission characteristic information.

In an optional implementation, the transceiver module is further configured to send the transmission characteristic information to the network device, where the transmission characteristic information indicates the characteristic of the to-be-transmitted service of the terminal device.

In an optional implementation, the processing module is further configured to determine valid time of the second information.

In an optional implementation, the transceiver module is further configured to receive valid time indication information from the network device. A correspondence between the valid time indication information and the second information may be in a one-to-one correspondence, or may be in a one-to-many correspondence.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the second information is carried in a radio resource control RRC message, or carried in a media access control control element MAC CE.

For technical effects brought by the seventh aspect or the optional implementations, refer to descriptions of the technical effects brought by the third aspect or the corresponding implementations.

According to an eighth aspect, a communication apparatus is provided. The communication apparatus is, for example, the fourth communication apparatus described above. The fourth communication apparatus is configured to perform the method according to any one of the fourth aspect or the possible implementations. Specifically, the fourth communication apparatus may include modules configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module but can implement different functions. For example, the fourth communication apparatus is a communication device, or is a chip or another component disposed in the communication device. For example, the communication device is a network device. The following uses an example in which the fourth communication apparatus is the network device. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module but can implement different functions. For example, if the fourth communication apparatus is the communication device, the transceiver is implemented as an antenna, a feeder, and a codec in the communication device. Alternatively, if the fourth communication apparatus is the chip disposed in the communication device, the transceiver (or the transmitter and the receiver) is, for example, a communication interface in the chip. The communication interface is connected to a radio frequency transceiver component in the communication device, to send and receive information through the radio frequency transceiver component. In a description process of the eighth aspect, the processing module, the transceiver module, and a case in which the fourth communication apparatus is the terminal device are still used as examples for description.

The transceiver module is configured to send second information to a terminal device, where the second information indicates a use manner of an SPS resource.

The processing module is further configured to perform transmission through the transceiver module based on the second information by using the SPS resource.

In an optional implementation, the second information may indicate at least one of the following: first indication information, indicating the terminal device to release, deactivate, or skip using a DL SPS resource; second indication information, indicating the terminal device to release, deactivate, or skip using a UL configured grant resource; third indication information, indicating the terminal device to release, deactivate, or skip using the DL SPS resource and the UL configured grant resource; and default indication information, indicating the terminal device to activate or use the DL SPS resource and the UL configured grant resource.

In an optional implementation, the transceiver module is further configured to send a transmission characteristic request to the terminal device, where the transmission characteristic request indicates the terminal device to report transmission characteristic information.

In an optional implementation, the transceiver module is further configured to receive the transmission characteristic information from the terminal device, where the transmission characteristic information indicates a characteristic of a to-be-transmitted service of the terminal device.

In an optional implementation, the processing module is further configured to determine valid time of the second information.

In an optional implementation, the transceiver module is further configured to send valid time indication information to the terminal device. A correspondence between the valid time indication information and the second information may be in a one-to-one correspondence, or may be in a one-to-many correspondence.

In an optional implementation, the valid time indication information indicates at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the second information is carried in a radio resource control RRC message, or carried in a media access control control element MAC CE.

For technical effects brought by the eighth aspect or the optional implementations, refer to descriptions of the technical effects brought by the fourth aspect or the corresponding implementations.

According to a ninth aspect, a communication apparatus is provided. The communication apparatus is, for example, the first communication apparatus described above. The communication apparatus includes a processor. Optionally, the communication apparatus may further include a memory, configured to store computer instructions. The processor and the memory are coupled to each other, to implement the method according to the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, to implement the method according to the first aspect or the possible implementations. For example, when the processor executes the computer instructions stored in the memory, the first communication apparatus is enabled to perform the method according to any one of the first aspect or the possible implementations. For example, the first communication apparatus is a communication device, or is a chip or another component disposed in the communication device. For example, the communication device is a terminal device.

If the first communication apparatus is the communication device, the communication interface is implemented, for example, as a transceiver (or a transmitter and a receiver) in the communication device, and the transceiver is implemented, for example, as an antenna, a feeder, and a codec in the communication device. Alternatively, if the first communication apparatus is the chip disposed in the communication device, the communication interface is, for example, an input/output interface such as an input/output pin in the chip, and the communication interface is connected to a radio frequency transceiver component in the communication device, to send and receive information through the radio frequency transceiver component.

According to a tenth aspect, a communication apparatus is provided. The communication apparatus is, for example, the second communication apparatus described above. The communication apparatus includes a processor. Optionally, the communication apparatus may further include a memory, configured to store computer instructions. The processor and the memory are coupled to each other, to implement the method according to the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, to implement the method according to the second aspect or the possible implementations. For example, when the processor executes the computer instructions stored in the memory, the second communication apparatus is enabled to perform the method according to any one of the second aspect or the possible implementations. For example, the second communication apparatus is a communication device, or is a chip or another component disposed in the communication device. For example, the communication device is a network device.

If the second communication apparatus is the communication device, the communication interface is implemented, for example, as a transceiver (or a transmitter and a receiver) in the communication device, and the transceiver is implemented, for example, as an antenna, a feeder, and a codec in the communication device. Alternatively, if the second communication apparatus is the chip disposed in the communication device, the communication interface is, for example, an input/output interface such as an input/output pin in the chip, and the communication interface is connected to a radio frequency transceiver component in the communication device, to send and receive information through the radio frequency transceiver component.

According to an eleventh aspect, a communication apparatus is provided. The communication apparatus is, for example, the third communication apparatus described above. The communication apparatus includes a processor. Optionally, the communication apparatus may further include a memory, configured to store computer instructions. The processor and the memory are coupled to each other, to implement the method according to the third aspect or the possible implementations. Alternatively, the third communication apparatus may not include a memory, and the memory may be located outside the third communication apparatus. Optionally, the third communication apparatus may further include a communication interface, configured to communicate with another apparatus or device. The processor, the memory, and the communication interface are coupled to each other, to implement the method according to the third aspect or the possible implementations. For example, when the processor executes the computer instructions stored in the memory, the third communication apparatus is enabled to perform the method according to any one of the third aspect or the possible implementations. For example, the third communication apparatus is a communication device, or is a chip or another component disposed in the communication device. For example, the communication device is a terminal device.

If the third communication apparatus is the communication device, the communication interface is implemented, for example, as a transceiver (or a transmitter and a receiver) in the communication device, and the transceiver is implemented, for example, as an antenna, a feeder, and a codec in the communication device. Alternatively, if the third communication apparatus is the chip disposed in the communication device, the communication interface is, for example, an input/output interface such as an input/output pin in the chip, and the communication interface is connected to a radio frequency transceiver component in the communication device, to send and receive information through the radio frequency transceiver component.

According to a twelfth aspect, a communication apparatus is provided. The communication apparatus is, for example, the fourth communication apparatus described above. The communication apparatus includes a processor. Optionally, the communication apparatus may further include a memory, configured to store computer instructions. The processor and the memory are coupled to each other, to implement the method according to the fourth aspect or the possible implementations. Alternatively, the fourth communication apparatus may not include a memory, and the memory may be located outside the fourth communication apparatus. Optionally, the fourth communication apparatus may further include a communication interface, configured to communicate with another apparatus or device. The processor, the memory, and the communication interface are coupled to each other, to implement the method according to the fourth aspect or the possible implementations. For example, when the processor executes the computer instructions stored in the memory, the fourth communication apparatus is enabled to perform the method according to any one of the fourth aspect or the possible implementations. For example, the fourth communication apparatus is a communication device, or is a chip or another component disposed in the communication device. For example, the communication device is a network device.

If the fourth communication apparatus is the communication device, the communication interface is implemented, for example, as a transceiver (or a transmitter and a receiver) in the communication device, and the transceiver is implemented, for example, as an antenna, a feeder, and a codec in the communication device. Alternatively, if the fourth communication apparatus is the chip disposed in the communication device, the communication interface is, for example, an input/output interface such as an input/output pin in the chip, and the communication interface is connected to a radio frequency transceiver component in the communication device, to send and receive information through the radio frequency transceiver component.

According to a thirteenth aspect, a chip is provided. The chip includes a processor and a communication interface, and the processor is coupled to the communication interface, to implement the method according to any one of the first aspect or the optional implementations.

Optionally, the chip may further include a memory. For example, the processor may read and execute a software program stored in the memory, to implement the method according to any one of the first aspect or the optional implementations. Alternatively, the memory may not be included in the chip, but is located outside the chip. That is, the processor may read and execute a software program stored in an external memory, to implement the method according to any one of the first aspect or the optional implementations.

According to a fourteenth aspect, a chip is provided. The chip includes a processor and a communication interface, and the processor is coupled to the communication interface, to implement the method according to any one of the second aspect or the optional implementations.

Optionally, the chip may further include a memory. For example, the processor may read and execute a software program stored in the memory, to implement the method according to any one of the second aspect or the optional implementations. Alternatively, the memory may not be included in the chip, but is located outside the chip. That is, the processor may read and execute a software program stored in an external memory, to implement the method according to any one of the second aspect or the optional implementations.

According to a fifteenth aspect, a chip is provided. The chip includes a processor and a communication interface, and the processor is coupled to the communication interface, to implement the method according to any one of the third aspect or the optional implementations.

Optionally, the chip may further include a memory. For example, the processor may read and execute a software program stored in the memory, to implement the method according to any one of the third aspect or the optional implementations. Alternatively, the memory may not be included in the chip, but is located outside the chip. That is, the processor may read and execute a software program stored in an external memory, to implement the method according to any one of the third aspect or the optional implementations.

According to a sixteenth aspect, a chip is provided. The chip includes a processor and a communication interface, and the processor is coupled to the communication interface, to implement the method according to any one of the fourth aspect or the optional implementations.

Optionally, the chip may further include a memory. For example, the processor may read and execute a software program stored in the memory, to implement the method according to any one of the fourth aspect or the optional implementations. Alternatively, the memory may not be included in the chip, but is located outside the chip. That is, the processor may read and execute a software program stored in an external memory, to implement the method according to any one of the fourth aspect or the optional implementations.

According to a seventeenth aspect, a communication system is provided. The communication system includes the communication apparatus according to the fifth aspect, the seventh aspect, the ninth aspect, the eleventh aspect, the thirteenth aspect, or the fifteenth aspect, and includes the communication apparatus according to the sixth aspect, the eighth aspect, the tenth aspect, the twelfth aspect, the fourteenth aspect, or the sixteenth aspect.

According to an eighteenth aspect, a computer-readable storage medium is provided. The computer-readable storage medium is configured to store computer instructions, and when the computer instructions are run on a computer, the computer is enabled to perform the method according to any one of the first aspect or the possible implementations.

According to a nineteenth aspect, a computer-readable storage medium is provided. The computer-readable storage medium is configured to store computer instructions, and when the computer instructions are run on a computer, the computer is enabled to perform the method according to any one of the second aspect or the possible implementations.

According to a twentieth aspect, a computer-readable storage medium is provided. The computer-readable storage medium is configured to store computer instructions, and when the computer instructions are run on a computer, the computer is enabled to perform the method according to any one of the third aspect or the possible implementations.

According to a twenty-first aspect, a computer-readable storage medium is provided. The computer-readable storage medium is configured to store computer instructions, and when the computer instructions are run on a computer, the computer is enabled to perform the method according to any one of the fourth aspect or the possible implementations.

According to a twenty-second aspect, a computer program product including instructions is provided. The computer program product is configured to store computer instructions. When the computer instructions are run on a computer, the computer is enabled to perform the method according to any one of the first aspect or the possible implementations.

According to a twenty-third aspect, a computer program product including instructions is provided. The computer program product is configured to store computer instructions. When the computer instructions are run on a computer, the computer is enabled to perform the method according to any one of the second aspect or the possible implementations.

According to a twenty-fourth aspect, a computer program product including instructions is provided. The computer program product is configured to store computer instructions. When the computer instructions are run on a computer, the computer is enabled to perform the method according to any one of the third aspect or the possible implementations.

According to a twenty-fifth aspect, a computer program product including instructions is provided. The computer program product is configured to store computer instructions. When the computer instructions are run on a computer, the computer is enabled to perform the method according to any one of the fourth aspect or the possible implementations.

In embodiments of this application, the network device and the terminal device may adjust the DCI transmission mode and/or the use manner of the SPS resource by using the first information and/or the second information based on the characteristic of the to-be-transmitted service of the terminal device, to improve communication efficiency and communication resource utilization.

DETAILED DESCRIPTION OF ILLUSTRATIVE EMBODIMENTS

Figures 1, 2:
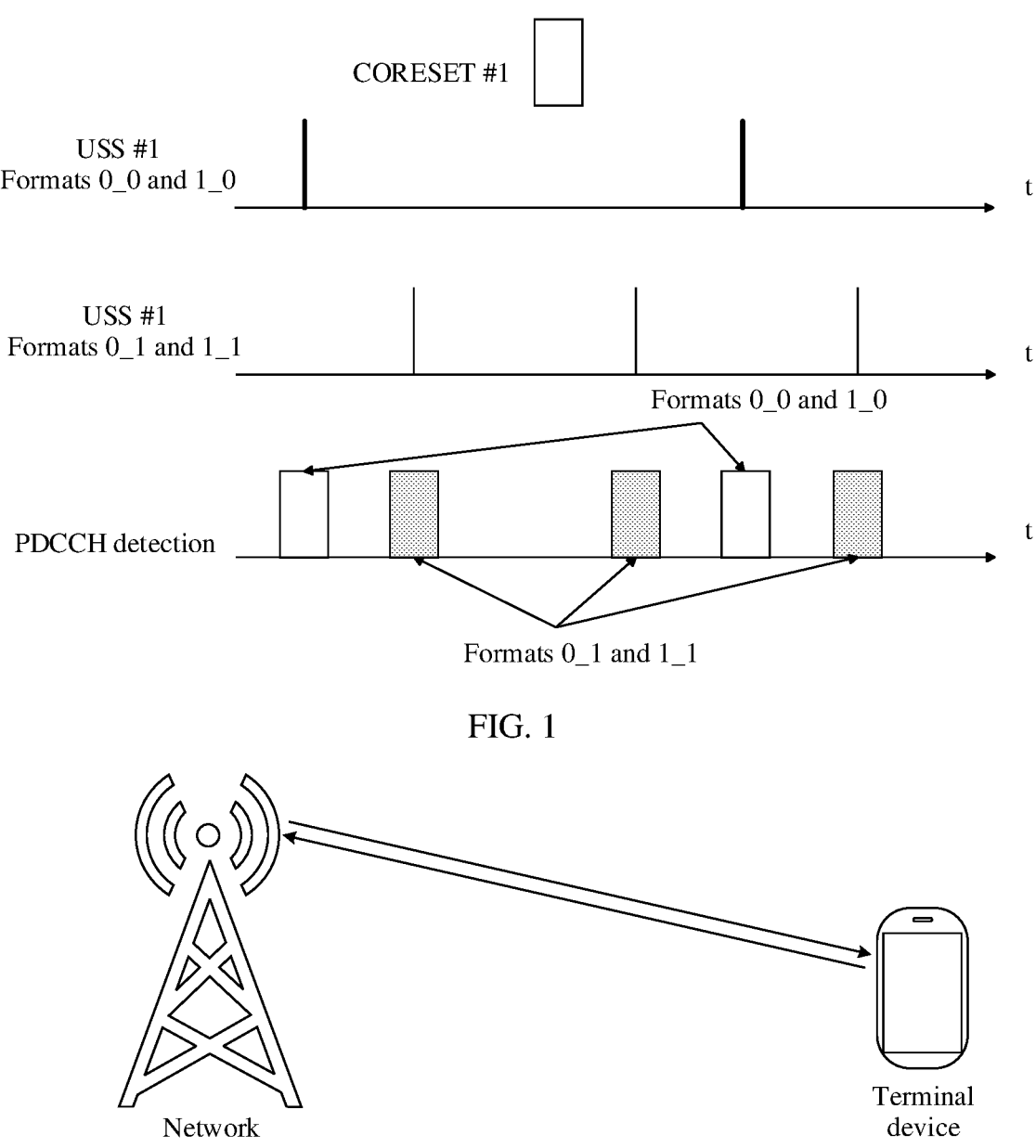
FIG. 1 is a schematic diagram of detecting DCI by a terminal device.
FIG. 2 is a schematic diagram of an application scenario according to an embodiment of this application.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

(1) A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or interact a voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an internet of things (IoT) terminal device, light user equipment (light UE), reduced capability user equipment (REDCAP UE), a subscriber unit, a subscriber station, a mobile station, a remote station, an access point (AP), a remote terminal, an access terminal, a user terminal, a user agent, a user device, or the like. For example, the terminal device may include a mobile phone (which is also referred to as a "cellular" phone), a computer with a mobile terminal device, a portable, pocket-sized, handheld, or computer built-in mobile apparatus, or the like. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

By way of example, and not limitation, in embodiments of this application, the terminal device may alternatively be an industrial sensor or a video surveillance terminal device.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBUs).

In embodiments of this application, the terminal device may further include a relay (relay). Alternatively, it is understood that any device that can perform data communication with a base station may be considered as a terminal device.

In embodiments of this application, an apparatus configured to implement a function of the terminal device may be a terminal device, or may be an apparatus, for example, a chip system, that can support the terminal device in implementing the function. The apparatus may be mounted in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal device.

(2) A network device includes, for example, an access network (AN) device such as a base station (for example, an access point), and may be a device that is in an access network and that communicates with a wireless terminal device over an air interface through one or more cells. Alternatively, the network device is, for example, a road side unit (RSU) in a vehicle-to-everything (V2X) technology. The base station may be configured to perform mutual conversion between a received over-the-air frame and an IP packet, to serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB) in a long term evolution (LTE) system or a long term evolution-advanced (LTE-A) system, may include a next generation NodeB (gNB) in a 5th generation (5G) mobile communication technology NR system (also briefly referred to as an NR system), or may include a central unit (CU) and a distributed unit (DU) in a cloud radio access network (Cloud RAN) system. This is not limited in embodiments of this application.

The network device may further include a core network device. The core network device includes, for example, an access and mobility management function (AMF), a user plane function (UPF), or the like. Because embodiments of this application mainly relate to an access network device, the network device below is an access network device unless otherwise specified.

In embodiments of this application, an apparatus configured to implement a function of a network device may be a network device, or may be an apparatus, for example, a chip system, that can support the network device in implementing the function. The apparatus may be mounted in the network device. The technical solutions provided in embodiments of this application are described by using an example in which the apparatus configured to implement the function of the network device is the network device.

(3) A bandwidth part (BWP) is a plurality of contiguous physical resource blocks in frequency domain, and the physical resource blocks are usually configured by a network device for a terminal device. The terminal device receives or sends data in the BWP. In an example of control resource transmission, one BWP includes at least one control resource set, and frequency domain resources included in the control resource set do not exceed a plurality of physical resource blocks included in the BWP in frequency domain. In an LTE system, scheduling is performed at a granularity of a carrier in frequency domain. It may be understood that data scheduling and transmission are performed based on each carrier. However, in an NR system, to flexibly support different bandwidth capabilities of different types of terminal devices, a concept of a BWP is introduced. A bandwidth part is provided through division for the terminal devices on a carrier, and the terminal device only needs to operate in at least one BWP on one carrier configured by the network device and does not need to know a width of the entire carrier. The BWP is a subset of a system carrier bandwidth, and a plurality of bandwidth parts may overlap in frequency domain. The network device may activate one downlink/uplink bandwidth part for the terminal device in configured bandwidth parts, transmit a PDSCH and a PDCCH to the terminal device in the active downlink bandwidth part, and the terminal device transmits an uplink shared channel (PUSCH) to the network in the active uplink bandwidth part. For example, a carrier is 100 MHz, and a BWP 1 configured for UE 1 is 100 MHz. That is, the UE 1 receives data in an entire carrier range, and UE 2 is configured to operate in a BWP 2 of 40 MHz on the carrier. In this case, the UE 2 only needs to receive data in the corresponding BWP 2, and does not need to pay attention to scheduling and data transmission states outside the BWP 2.

(4) A control resource set (CORESET) is a frequency domain subband occupied in a BWP and a quantity of time domain symbols occupied in the BWP, indicates a channel location in frequency domain, and is a resource set used for control channel transmission. Time domain resources of the CORESET may be contiguous or non-contiguous. For example, 12 RBs are occupied in the BWP, and a time domain length is two contiguous time domain symbols.

(5) Search space (SS) may also be referred to as a search space set (SS set). For ease of description, a description of the search space or the search space set is simplified as search space subsequently. The search space includes a monitoring periodicity and a specific time domain symbol occasion in a specific slot in the periodicity, and indicates a channel location in time domain. Time domain scheduling in the NR system is more flexible than that in the LTE system. The NR system supports flexible scheduling of a plurality of symbol lengths in one slot. For example, a transmission time interval (TTI) may be two time domain symbols or 14 time domain symbols. The SS is used to configure a monitoring periodicity of a channel, and the channel may be received in combination with the SS and a CORESET. For example, if the SS is configured as five slots, the terminal device searches for the channel in a corresponding CORESET every five slots.

(6) PDCCH Detection

In the NR system, the network device may configure a BWP for the terminal device through a radio resource control (RRC) message, and interact with the terminal device in the BWP. The BWP may be considered as a frequency domain range for information transmission between the network device and the terminal device. Further, the network device may configure a CORESET and SS for the terminal device, and send a PDCCH to the terminal device on a detection occasion including the CORESET and the SS. The CORESET is used to determine a time-frequency resource pattern of PDCCH detection, and the SS is used to determine a periodicity, a time point, a DCI format, and the like of the PDCCH detection. The PDCCH carries downlink control information (DCI). Therefore, the terminal device may detect the DCI based on the CORESET and the SS. Detection on the PDCCH may also be referred to as detection on the DCI or blind detection on the DCI.

It should be noted that the network device may configure different detection occasions for DCI in different formats. For example, as shown in FIG. 1, the network device configures user-specific search spaces (USS) #1 and USS #2 that both correspond to a CORESET #1. In addition, the network device configures DCI formats detected by the terminal device in the USS #1 as 0_0 and 1_0 (identified by formats 0-0-And-1-0), and DCI formats detected in the USS #2 as 0_1 and 1_1 (identified by formats 0-1-And-1-1). The terminal device performs PDCCH detection in a time-frequency resource set determined based on the "USS #1+CORESET #1", where detected objects are the DCI format 0_0 and the DCI format 1_0. In addition, the UE further performs PDCCH detection in a time-frequency resource set determined based on the "USS #2+CORESET #1", where detected objects are the DCI format 0_1 and the DCI format 1_1.

The DCI format 0_0 is DCI for scheduling a PUSCH, and the DCI format 1_0 is DCI for scheduling a PDSCH. The DCI format 0_1 is DCI for scheduling a PUSCH, and the DCI format 1_1 is DCI for scheduling a PDSCH.

(7) DCI Size Alignment

In NR, sizes of DCI for scheduling a PUSCH and DCI for scheduling a PDSCH are aligned, so that DCI in different formats has a same quantity of bits. In this way, a computing amount and complexity of detecting the DCI by the UE can be reduced. Examples are as follows:

(a) In common search space (common SS, CSS), a DCI format 0_0 is aligned with a DCI format 1_0.

(b) In user-specific search space (UE-specific SS, USS), a padding bit (such as "o") is always added to a DCI format of a smaller size until the DCI format of the smaller size is the same as a DCI format of a larger size between a DCI format 0_0 and a DCI format 1_0.

(c) In user-specific search space (USS), a padding bit (such as "o") is always added to a DCI format of a smaller size until the DCI format of the smaller size is the same as a DCI format of a larger size between a DCI format 0_0 and a DCI format 1_0.

In embodiments of this application, the "size alignment (size alignment)" means that a quantity of bits of another type of second DCI is determined based on a quantity of bits of one type of first DCI. For example, the network device sends the second DCI based on a size of the first DCI. Correspondingly, the terminal device detects the second DCI based on the size of the first DCI. The "size alignment" may also be understood as adjusting a size of DCI or aligning sizes of DCI. For brevity of description, the "size alignment" is briefly referred to as alignment.

(8) Semi-Persistent Transmission

Semi-persistent transmission, also referred to as semi-persistent scheduling (SPS), means that the network device configures periodic transmission resources for the terminal device, and in these periodic resources, the terminal device can transmit data without scheduling by using DCI, including:

(a) Downlink semi-persistent scheduling (DL SPS): The network device configures a periodic downlink resource for the terminal device, and performs activation (where the resource becomes a valid resource) or deactivation (where the resource becomes an invalid resource) by using one piece of DCI. The terminal device can perform downlink transmission only when the resource is valid.

(b) Uplink configured grant (UL configured grant) type 1: The network device configures an uplink periodic resource for the terminal device. Once the resource is configured, the resource is valid. Validity and invalidity of the resource do not need to be activated/deactivated by using DCI, and can be changed only by using RRC reconfiguration. For example, the resource is released by using an RRC reconfiguration method.

(c) Uplink configured grant (UL configured grant) type 2: The network device configures an uplink periodic resource for the terminal device, and performs activation/deactivation by using one piece of DCI. The terminal device can perform uplink transmission only when the resource is valid.

For brevity of description, the foregoing is collectively referred to as the SPS in embodiments of this application.

(9) Fallback DCI and Non-Fallback DCI

The fallback DCI is DCI configured without depending on user-specific (UE-specific) higher layer signaling. A definition of a field and a size of the field are usually predefined in a standard, or are determined based on a cell common parameter. The cell common parameter may be, for example, parameter information broadcast by the network device through system information. Therefore, a TB scheduled by using the fallback DCI is small and a scheduling capability is weak, for example, a DCI format 0_0 and a DCI format 1_0. The non-fallback DCI is DCI configured based on user-specific higher layer signaling. A definition of a field and a size of the field may be determined based on a user-specific RRC configuration. Therefore, a scheduling capability is strong, for example, a DCI format 0_1 and a DCI format 1_1.

(10) "At least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In addition, unless otherwise specified, ordinal numbers such as "first" and "second" in embodiments of this application are for distinguishing between a plurality of objects, but are not intended to limit an order, a time sequence, priorities, or importance of the plurality of objects. For example, a first wake-up signal and a second wake-up signal are merely used to distinguish between different wake-up signals, but do not indicate that content, priorities, sending sequences, importance, or the like of the two wake-up signals are different.

The foregoing describes some concepts in embodiments of this application, and the following describes technical characteristics in embodiments of this application.

In an NR system, to further reduce energy consumption of a terminal and communication complexity, a light terminal, also referred to as a reduced capability terminal device (REDCAP UE), is provided. Application scenarios of the light terminal include the following several types:

(a) Industrial sensor network: Transmission services are mainly uplink (UL) services, and the services have obvious regularity.

(b) Video surveillance: UL services account for an absolute proportion of transmission services, and a service volume remains stable for a long time.

(c) Wearable device: Both a downlink (DL) service and a UL service exist in transmission services, and a transmission service volume is large (for example, a video call in a smartwatch).

Terminal devices in different application scenarios perform uplink transmission or downlink transmission at different frequency. It can be learned that if the REDCAP UE is scheduled according to a method in a conventional technology, the UE may perform unnecessary DCI format detection. As a result, a quantity of detection times is increased, and energy overheads are wasted. However, for an idle SPS resource, if the idle SPS resource is not deactivated by using DCI/released by using RRC reconfiguration, a waste of resources is caused. If a network device separately sends DCI/RRC signaling to widely deployed REDCAP UE, a large quantity of downlink transmission resource overheads are caused.

In view of this, the technical solutions in embodiments of this application are provided. In embodiments of this application, the network device may configure service characteristic indication information for the terminal device by using first information. The terminal device may adjust a DCI detection manner based on the first information, to improve DCI detection efficiency. Alternatively, the terminal device may adjust a use manner of an SPS resource based on the first information, to improve resource utilization of a communication system. For the network device, sizes of DCI may be aligned based on the configuration of the first information, to reduce transmission consumption and improve resource utilization of the communication system.

The technical solution provided in embodiments of this application may be applied to a 4th generation (4G) mobile communication technology system, for example, an LTE system, or may be applied to a 5G system, for example, an NR system, or may be applied to a next-generation mobile communication system or another similar communication system, provided that one entity can initiate paging to another entity. This is not specifically limited. In addition, an air interface communication process between the network device and the terminal device is used as an example in a description process of embodiments of this application. Actually, the technical solutions provided in embodiments of this application may also be applied to a sidelink (SL), provided that one terminal device can initiate paging to another terminal device. For example, the technical solutions provided in embodiments of this application may be applied to a device-to-device (D2D) scenario, an NR D2D scenario, or an LTE D2D scenario; or may be applied to a vehicle-to-everything (V2X) scenario, an NR V2X scenario, or an LTE V2X scenario, for example, may be applied to an internet of vehicles, such as V2X, LTE-V, and vehicle-to-vehicle (V2V), or may be used in fields such as intelligent driving and intelligent connected vehicles.

FIG. 2 shows an application scenario according to an embodiment of this application. In FIG. 2, a network device serves a terminal device in a wireless transmission manner. The terminal device may receive a PDCCH and DCI carried on the PDCCH from the network device.

The network device in FIG. 2 is, for example, a base station. The base station corresponds to different devices in different systems. For example, in a 4G system, the base station may correspond to a 4G base station, for example, an eNB. In a 5G system, the base station corresponds to a 5G base station, for example, a gNB. Certainly, the technical solutions provided in embodiments of this application may also be applied to a future mobile communication system. Therefore, the network device in FIG. 2 may also correspond to an access network device in the future mobile communication system. In FIG. 2, for example, the network device is a base station. Actually, based on the foregoing descriptions, the network device may alternatively be a device such as an RSU. In addition, in FIG. 2, for example, the terminal device is a mobile phone. Actually, based on the foregoing descriptions of the terminal device, the terminal device in embodiments of this application is not limited to the mobile phone.

Embodiment 1

Figure 3:
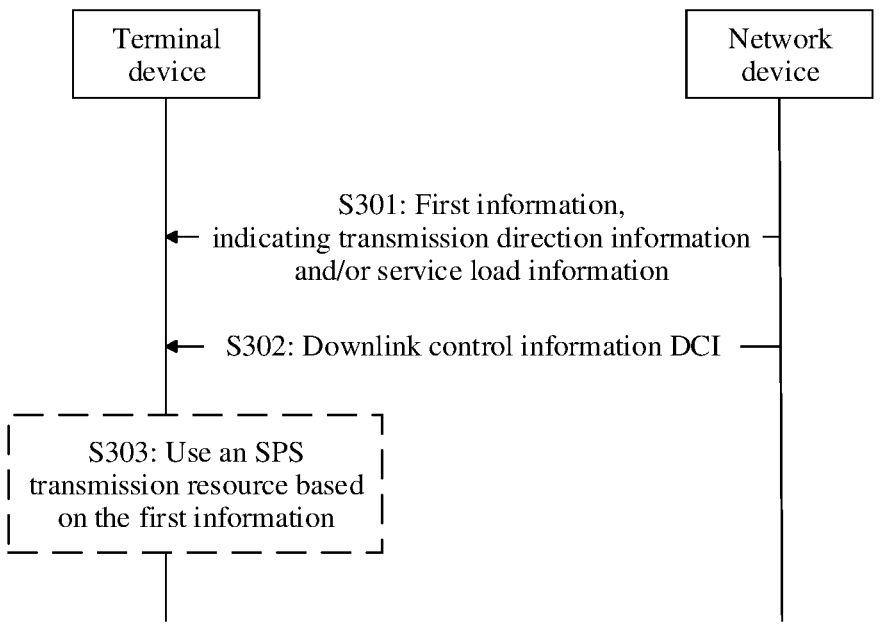
FIG. 3 is a flowchart of a communication method according to an embodiment of this application.

An embodiment of this application provides a communication method. For ease of description, an example in which the method is performed by a network device and a terminal device is used below. Because the example in which the method is applied to the network architecture shown in FIG. 2 is used in this embodiment, the following network device may be the network device in the network architecture shown in FIG. 2, and the following terminal device may be the terminal device in the network architecture shown in FIG. 2. As shown in FIG. 3, the communication method provided in this embodiment of this application includes step S301 and step S302.

S301: The network device sends first information to the terminal device, where the first information indicates transmission direction information and/or service load information. Correspondingly, the terminal device receives the first information from the network device.

S302: The network device sends downlink control information DCI to the terminal device. Correspondingly, the terminal device receives the DCI from the network device based on the first information.

Optionally, the method further includes step S303: The terminal device performs transmission based on the first information by using an SPS resource.

The network device indicates transmission characteristic indication information to the terminal device by using the first information, where the transmission characteristic indication information includes the transmission direction information and/or the service load information. Further, the terminal device may align a DCI size based on the transmission characteristic indication information and perform DCI detection. In other words, the network device may configure corresponding transmission characteristic indication information based on a characteristic of a to-be-transmitted service of the terminal device, to reduce DCI transmission complexity and improve communication efficiency and resource utilization.

For step S301, the network device sends the first information to the terminal device, where the first information indicates the transmission direction information and/or the service load information. Correspondingly, the terminal device receives the first information from the network device.

The transmission direction information indicates characteristic information of DCI transmission, where the characteristic information of DCI transmission indicates the terminal device to detect the DCI based on a transmission characteristic of the DCI. Specifically, the transmission direction information may indicate at least one of the following states: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission. Specifically, the DCI in the first format is DCI for scheduling a PUSCH, and the DCI in the second format is DCI for scheduling a PDSCH. For example, the DCI in the first format is a DCI format 0_1 or a DCI format 0_0, and the DCI in the second format is a DCI format 1_0 or a DCI format 1_1.

In other words, the terminal device adjusts blind detection on the DCI in the first format and the DCI in the second format based on the transmission direction information. The network device and the terminal device may agree on the transmission characteristic of the DCI by using the first information. For example, when to-be-transmitted services of the terminal device are mainly uplink services, the network device may indicate the first transmission direction state, and then the terminal device adjusts, based on the DCI for scheduling uplink transmission, a size of the DCI for scheduling downlink transmission. This preferentially ensures receiving accuracy of the DCI in the first format, simplifies detection complexity, and improves communication efficiency. For another example, when all to-be-transmitted services of the terminal device are uplink services, the network device may indicate the second transmission direction state, and the terminal device receives only the DCI in the first format and does not need to receive the DCI in the second format. Correspondingly, the network device may no longer send the DCI in the second format, to improve communication efficiency and improve resource utilization of a communication system.

In a possible design, alignment methods include zero padding and truncation (truncate). For example, the network device indicates the first transmission direction state to the terminal device, to indicate that the size of the DCI in the second format is aligned with the size of the DCI in the first format. When the size of the DCI in the first format is greater than the size of the DCI in the second format, zero padding may be performed on the DCI in the second format, so that the size of the DCI in the second format is equal to the size of the DCI in the first format. When the size of the DCI in the first format is smaller than the size of the DCI in the second format, the DCI in the second format may be truncated, so that the size of the DCI in the second format is equal to the size of the DCI in the first format. Alignment of the DCI in the two formats can be quickly implemented through zero padding and truncation. The following describes meanings of the first to the fourth transmission direction states in detail.

The first transmission direction state is a state in which transmission scheduling is mainly performed by using the DCI in the first format. Specifically, the network device adjusts the size of the DCI in the second format based on the size of the DCI in the first format, that is, aligns the size of the DCI in the second format with the size of the DCI in the first format. For example, when the size of the DCI in the second format is greater than the size of the DCI in the first format, most significant Q bits in one or more indicator fields in the DCI in the second format are truncated, where Q is a positive integer, until the size of the DCI in the second format is the same as the size of the DCI in the first format, to avoid filling a redundant bit into the DCI in the first format and improve transmission reliability of the DCI in the first format. When the size of the DCI in the second format is smaller than the size of the DCI in the first format, the network device fills P padding bits, for example, symbols 'o', into the DCI in the second format until the size of the DCI in the second format is the same as the size of the DCI in the first format, to avoid truncation of the DCI in the first format and ensure scheduling accuracy of the DCI in the first format. Correspondingly, the terminal device may detect the DCI in the first format and the DCI in the second format based on the first transmission direction state, and the size of the DCI in the first format is used during detection. Compared with a conventional technology in which DCI of a smaller size is always aligned with DCI of a larger size in USS for a manner of alignment between the DCI for scheduling uplink transmission and the DCI for scheduling downlink transmission, for a terminal device with a large quantity of uplink services, there is a large amount of DCI (that is, the DCI in the first format) for scheduling uplink transmission, so that the DCI in the first format may be mainly used as a reference, and the size of the DCI in the second format is aligned with the size of the DCI in the first format, to ensure transmission reliability and scheduling accuracy of the DCI in the first format, and further ensure uplink transmission performance.

The second transmission direction state is a state in which scheduling is performed by using only the DCI in the first format and the DCI in the second format is not sent or received. For example, when all to-be-transmitted services of the terminal device are uplink services, the network device sends only the DCI in the first format. Correspondingly, the terminal device needs to detect only the DCI in the first format, and does not need to detect the DCI in the second format. Further optionally, the DCI in the first format may not include a DCI format indicator field. The DCI format indicator field indicates a DCI format, that is, indicates whether the DCI format is the first format or the second format. When the first information indicates the second transmission state, the DCI in the first format does not include the DCI format indicator field, or the DCI format indicator field is reused to indicate other information, so that a quantity of payloads of the first DCI can be reduced, and DCI transmission reliability can be improved.

For example, the first transmission direction state or the second transmission direction state may be applied to an industrial sensor network. In this application scenario, there are a large quantity of industrial sensor terminals, configured to transmit electrical signal information obtained through conversion to the network device. Therefore, to-be-transmitted services of the industrial sensor terminals are mainly transmitted in an uplink direction. In the industrial sensor network, the terminal device and the network device may preferentially consider transmission reliability and scheduling accuracy of the DCI in the first format based on the first transmission direction state, to ensure transmission quality of the uplink services, reduce DCI detection complexity, and improve communication efficiency. In the industrial sensor network, the terminal device and the network device may receive and send only the DCI in the first format based on the second transmission direction state, to save transmission resources of the DCI in the second format.

The third transmission direction state is a state in which transmission scheduling is mainly performed by using the DCI in the second format. Specifically, the network device adjusts the size of the DCI in the first format based on the size of the DCI in the second format, that is, aligns the size of the DCI in the first format with the size of the DCI in the second format. Correspondingly, the terminal device may detect the DCI in the first format and the DCI in the second format based on the third transmission direction state, and the size of the DCI in the second format is used during detection. For details, refer to the foregoing related descriptions of the first transmission direction state.

The fourth transmission direction state is a state in which scheduling is performed only by using the DCI in the second format and the DCI in the first format is not sent or received. For example, when all to-be-transmitted services of the terminal device are downlink services, the network device sends only the DCI in the second format. Correspondingly, the terminal device needs to detect only the DCI in the second format, and does not need to detect the DCI in the first format. Further optionally, the DCI in the second format may not include a DCI format indicator field. The DCI format indicator field indicates a DCI format, that is, indicates whether the DCI format is the first format or the second format. When the first information indicates the fourth transmission state, the DCI in the second format does not include the DCI format indicator field, or the DCI format indicator field is reused to indicate other information, so that a quantity of payloads of the second DCI can be reduced, and DCI transmission reliability can be improved.

The default transmission direction state may indicate the terminal device to restore a detection mode and fall back to a transmission state before adjustment is performed based on the first to the fourth transmission direction states. It may be understood that the default transmission direction state indicates the terminal device to no longer use first transmission direction state information to fourth transmission direction state information that are previously indicated, and restore to a state used in the conventional technology. For example, the network device sends first transmission direction information to the terminal device to indicate the second transmission direction state, and the terminal device receives only the DCI in the first format and does not receive the DCI in the second format based on the indication of the first transmission direction information. The network device sends second transmission direction information to the terminal device to indicate the default transmission direction state, and the terminal device no longer uses the second transmission direction state, restores receiving of the DCI in the two formats, detects the DCI in the first format based on a definition of the DCI in the first format, and detects the DCI in the second format based on a definition of the DCI in the second format. In other words, the network device may fall back a DCI transmission mode of the terminal device based on the default transmission direction state by changing the first information when a service characteristic changes.

In a possible implementation, the transmission direction information is indicated by a plurality of bits or fields. For example, five bit values are predefined to respectively indicate the first to the fourth transmission direction states and the default transmission direction state, and a transmission characteristic of DCI in each state is defined. The terminal device may determine corresponding transmission direction state information based on a bit value, and further receive DCI based on the transmission characteristic. For another example, the transmission direction information is indicated by a plurality of states or values of one field. For example, a 3-bit field is predefined, where the 3-bit field may indicate eight states such as "000, 001, 010, . . . , 111", and five of the states are defined to respectively indicate the first to the fourth transmission direction states and the default transmission direction state. The terminal device may determine corresponding transmission direction state information based on a value of the field, and further receive DCI based on a transmission characteristic.

The first information indicates the transmission direction information, so that the DCI transmission mode can be adjusted based on a direction of the to-be-transmitted service of the terminal device, to improve communication efficiency and optimize user experience.

The service load information includes at least one of the following: a first load state, where the first load state may indicate that service load of the terminal device is heavy load; a second load state, where the second load state may indicate that service load of the terminal device is light load; and a default load state, indicating that service load of the terminal device is normal and a DCI transmission mode does not need to be additionally adjusted.

It should be noted that the first load state and the second load state are determined based on load information of the to-be-transmitted service of the terminal device. In other words, the first load state and the second load state indicate a time-frequency resource for DCI transmission, but it does not mean that the first load state and the second load state indicate specific load information.

Optionally, in correspondence to different service load information, the network device may transmit the DCI by using different time-frequency resources. Specifically, the following several cases are included.

When the terminal device is in the first load state, the terminal device detects only first-type DCI, or detects the first-type DCI in search space corresponding to second-type DCI; and/or when the terminal device is in the second load state, the terminal device detects only the second-type DCI, or detects the second-type DCI in search space corresponding to the first-type DCI; and/or when the terminal device is in the default load state, the terminal device detects the first-type DCI in the search space corresponding to the first-type DCI, and/or detects the second-type DCI in the search space corresponding to the second-type DCI.

It should be noted that the network device may configure parameter information of search space by using higher layer signaling, including a format of DCI detected in the search space. When the network device configures the terminal device to detect only the first-type DCI and not to detect the second-type DCI, the default load state indicates the terminal device to detect the first-type DCI in the search space corresponding to the first-type DCI. In other words, the default load state indicates to restore to an original transmission state, and the terminal device does not additionally receive the second-type DCI. The first load state may be understood as that the terminal device and the network device may detect the first-type DCI in candidate search space when a to-be-transmitted service volume of the terminal device is large, where the candidate search space is, for example, the search space of the second-type DCI, to improve a transmission rate and optimize user experience. The second load state may be understood as that the network device may increase a periodicity of search space to enable the terminal device to reduce frequency of blindly detecting the DCI, or avoid unnecessary detection on the first-type DCI when a to-be-transmitted service volume of the terminal device is small, to save communication resources and reduce energy consumption of the terminal device.

The first-type DCI and the second-type DCI are in different formats. An indicator field included in the second-type DCI and a size of the indicator field are predefined, and do not depend on a user equipment-specific higher layer configuration. For example, the first-type DCI is non-fallback DCI, and the second-type DCI is fallback DCI.

Figure 4A:
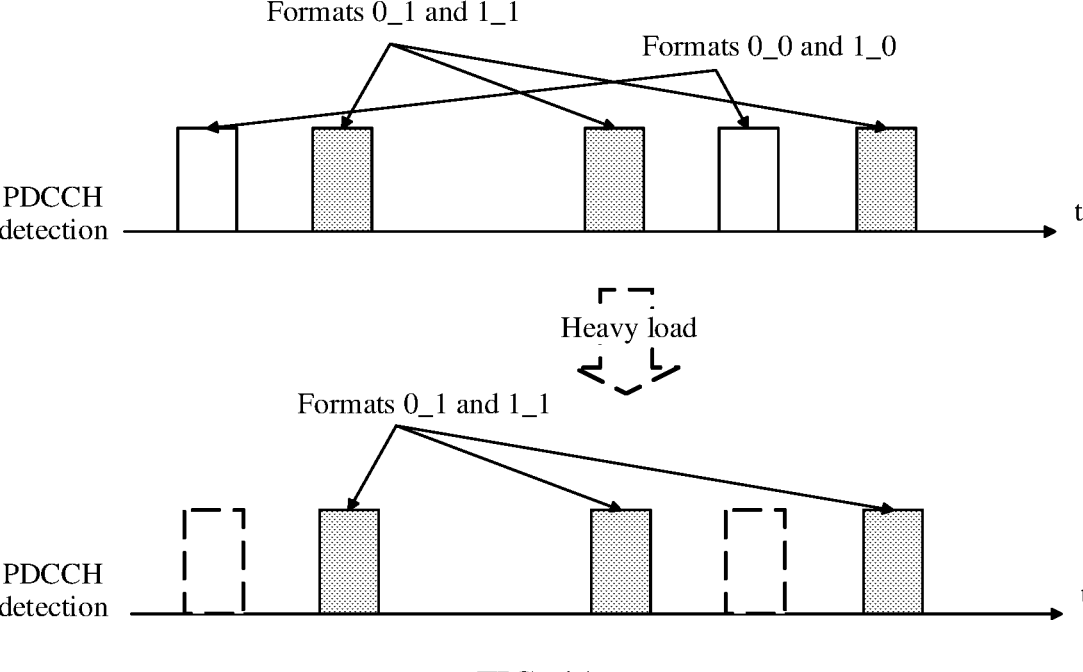
FIG. 4A to FIG. 4C are three schematic diagrams of receiving DCI based on first information according to an embodiment of this application.
Figures 4B, 4C:
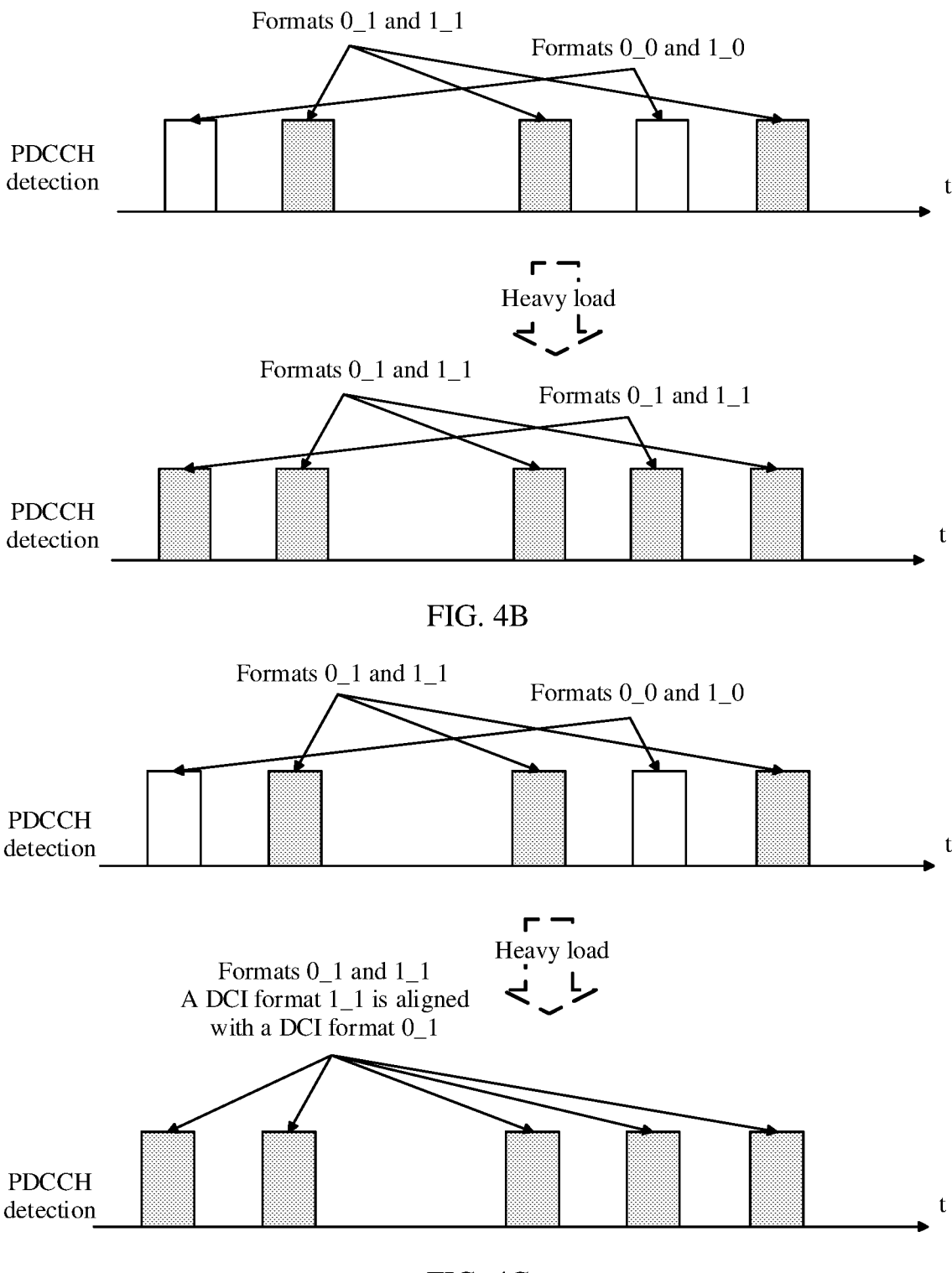
Figure 5A:
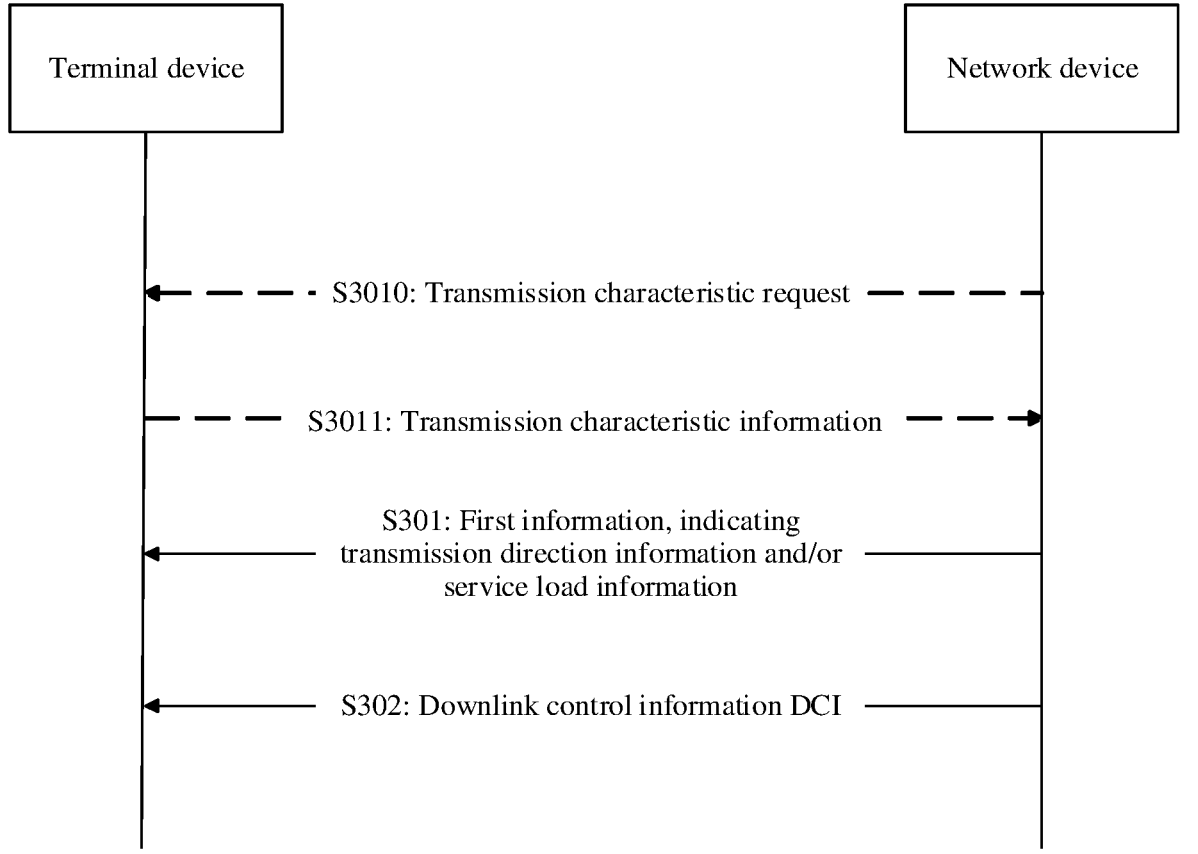
FIG. 5A and FIG. 5B are two flowcharts of a communication method according to an embodiment of this application.
Figure 5B:
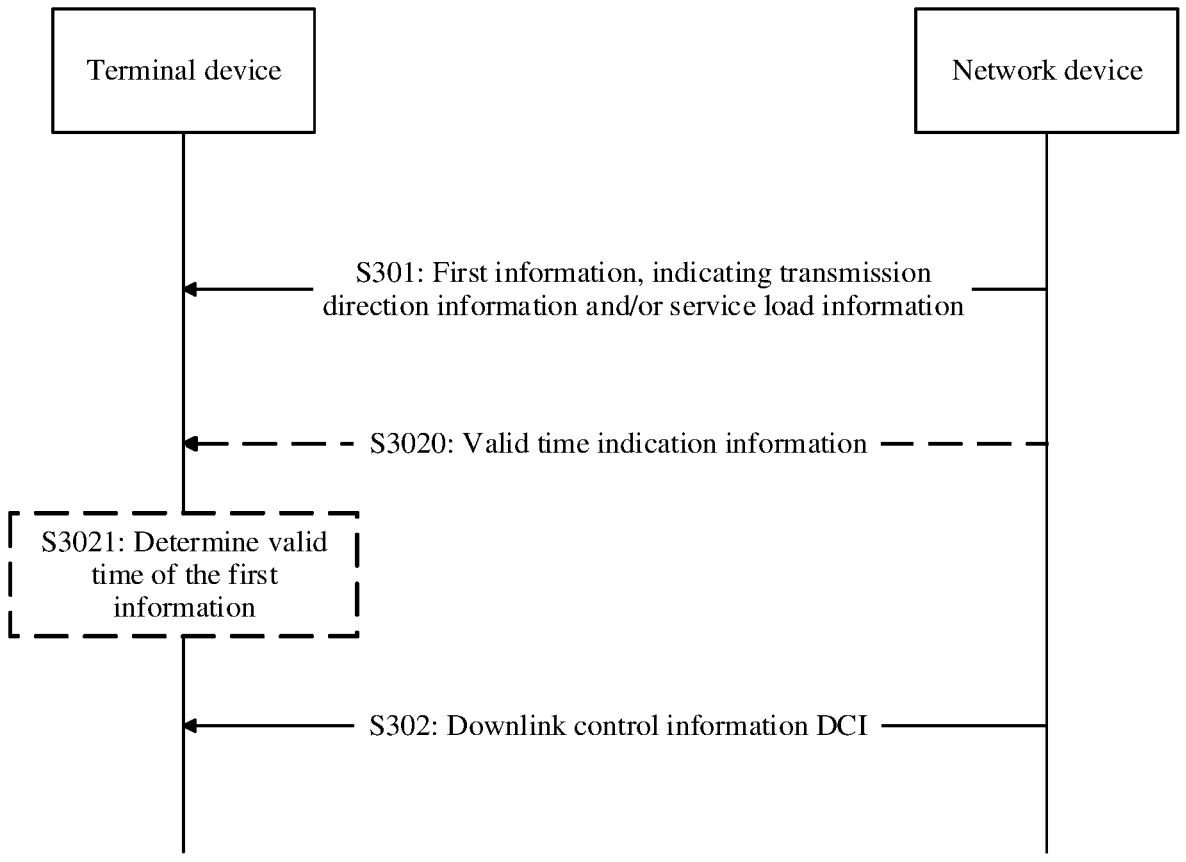

When the to-be-transmitted service volume of the terminal device is large, each time the network device schedules transmission of the terminal device, the network device may schedule a transport block (TB) as large as possible. However, to schedule a larger TB, the network device may need to indicate the terminal device to use a higher modulation order, or need to indicate the terminal device to perform more accurate channel measurement and reporting. Consequently, a large quantity of spectrum resources are consumed, causing a shortage of spectrum resources. In the communication method provided in this embodiment of this application, when the to-be-transmitted service volume of the terminal device is large, the network device and the terminal device may schedule a PUSCH and/or a PDSCH by transmitting non-fallback DCI. The non-fallback DCI may indicate a higher modulation order, indicate the terminal device to channel state measurement and reporting, and indicate the terminal device to use a reference signal port for multi-user multiple-input multiple-output (MU-MIMO) transmission. In other words, when the terminal device is in the first load state, the terminal device detects only the first-type DCI, or detects the first-type DCI in the search space corresponding to the second-type DCI. For example, as shown in FIG. 4A, if the network device schedules the PUSCH and/or the PDSCH by using only the first-type DCI, the terminal device needs to receive only the first-type DCI. For another example, the network device transmits the first-type DCI in the SS (briefly referred to as second SS below) corresponding to the second-type DCI. As shown in FIG. 4B, the first-type DCI is transmitted in both the SS (briefly referred to as first SS below) corresponding to the first-type DCI and the second SS. Further, the network device can improve DCI scheduling performance without performing SS reconfiguration on the terminal device, and schedule the terminal device to transmit a larger TB on more PDCCH detection occasions. This meets a transmission requirement of the terminal device in a heavy-load state, improves user experience, and reduces signaling consumption of SS reconfiguration performed by the network device.

Correspondingly, when the to-be-transmitted amount of the terminal device is small, scheduling may be performed by using the second-type DCI. In other words, when the terminal device is in the second load state, the terminal device detects only the second-type DCI, or detects the second-type DCI in the search space corresponding to the first-type DCI. For example, if the network device schedules the PUSCH and/or the PDSCH by using only the second-type DCI, the terminal device needs to receive only the second-type DCI, to reduce power consumption for DCI detection. For another example, the network device also sends the second-type DCI in the first SS. An indicator field in the fallback DCI does not depend on a UE-specific higher layer configuration, the second-type DCI has a small quantity of bits, and transmission is more reliable. Therefore, scheduling a small TB can improve DCI transmission reliability while meeting a service transmission requirement, and reduce blind detection consumption of the terminal device and signaling overheads of SS reconfiguration performed by the network device. In another possible implementation, the network device may transmit the first-type DCI only in the first SS. In other words, the terminal device detects only the first-type DCI. In this transmission mode, although the to-be-transmitted service volume of the terminal device is not large, the network device may still flexibly schedule the terminal device by using the first-type DCI. This helps cope with an unexpected service, and reduces power consumption and signaling overheads of SS reconfiguration performed by the network device.

The default load state is similar to the default transmission direction state, and indicates the terminal device to restore a detection mode and fall back to a transmission state before adjustment is performed based on the first load state and/or the second load state. It may be understood that the default load state indicates the terminal device to no longer use first load state information and/or second load state information that are/is previously indicated, and restore to a state used in the conventional technology. For example, the network device sends the first load state information to the terminal device to indicate the first load state, and the terminal device detects only the first-type DCI and does not receive the second-type DCI based on the indication of the first load state information. The network device sends the second load state information to the terminal device to indicate the default load state, and the terminal device no longer uses the first load state and restores receiving of the second-type DCI. In other words, the network device may fall back a DCI transmission mode of the terminal device based on the default load state by changing the first information when a service characteristic changes.

When the first information includes the transmission direction information and the service load information, both the network device and the terminal device use indications of the transmission direction information and the service load information to adjust the DCI transmission mode. FIG. 4C shows a transmission mode of the first information. The first information includes the transmission direction information and the service load information. The transmission direction information indicates the first transmission direction state, and the service load information indicates the first load state. The network device sends the first-type DCI in the second SS, and the network device aligns the DCI in the second format with the DCI in the first format. Correspondingly, the terminal device detects the DCI in the first format in the second SS, and the terminal device receives the DCI in the first format and the DCI in the second format based on the size of the DCI in the first format. The transmission direction information and the service load information are combined, so that the DCI transmission mode can be better adjusted based on service characteristic information, to improve communication efficiency and reduce resource utilization.

In a possible implementation, the transmission direction information and the service load information may be jointly indicated. For example, as shown in Table 1, the first information may include a 3-bit indicator field, and eight different states of the field respectively indicate combinations of the transmission direction indication information and the service load indication information. It should be noted that Table 1 is merely an example of a joint indication method, and there may be another combination manner of a transmission direction state and a load state. This is not limited in the present invention.

TABLE 1

Example in which first information indicates transmission direction information and service load information

| State | First information |
|---|---|
| 000 | First transmission direction state + first load state |
| 001 | Second transmission direction state + first load state |
| 010 | Third transmission direction state + first load state |
| 011 | Fourth transmission direction state + first load state |

TABLE 1-continued

| Example in which first information indicates transmission direction information and service load information | |
|---|---|
| State | First information |
| 100 | First transmission direction state + second load state |
| 101 | Third transmission direction state + second load state |
| 110 | Default transmission direction state + default load state |
| 111 | Reserved (not used) |

Optionally, as shown in FIG. 5A, before step S301, the method further includes step S3011: The terminal device reports transmission characteristic information to the network device, where the transmission characteristic information indicates the characteristic of the to-be-transmitted service of the terminal device, for example, may include the transmission direction information and the service load information. After receiving the transmission characteristic information from the terminal device, the network device may determine the characteristic of the to-be-transmitted service of the terminal device, and further determine the first information based on the service characteristic. Optionally, before step S3011, the method further includes step S3010: The network device sends a transmission characteristic request to the terminal device, where the transmission characteristic request indicates the terminal device to report the transmission characteristic information. Alternatively, S3010 is as follows: The network device sends capability information to the terminal device, where the capability information indicates that the network device supports adjustment of the DCI transmission mode based on the characteristic of the to-be-transmitted service of the terminal device. After receiving the capability information, the terminal device may perform step S301. The capability information may be sent by using a broadcast or multicast message. Further, the network device may send the capability information to a plurality of terminal devices by using one broadcast or multicast message, to reduce signaling overheads. By performing step S3010 and step S3011, the network device and the terminal device may exchange the characteristic information of the to-be-transmitted service of the terminal device, so that the network device can optimize the DCI transmission mode more accurately based on the service characteristic, to improve user experience and improve communication efficiency of the communication system.

It should be noted that step S301 and steps S3010 and S3011 may be sent for a plurality of times. The network device may change the transmission characteristic indication information based on a real-time service characteristic by sending the first information for a plurality of times. When the service characteristic of the terminal device changes, the network device may agree on a new DCI transmission mode with the terminal device by changing the indication of the first information, to flexibly adjust a scheduling manner based on the service characteristic, and improve communication efficiency of the terminal device.

Optionally, as shown in FIG. 5B, before step S302, the method further includes step S3021: The terminal device determines valid time of the first information. In other words, step S302 is as follows: The terminal device receives the DCI from the network device based on the first information within the valid time. When the valid time expires, the terminal device may restore to a DCI detection manner in the conventional technology, or the terminal device may restore to a previous DCI detection manner. Specifically, when valid time indication information is from the network device, the valid time is predefined in a standard, or the valid time is preconfigured, further optionally, before step S3021, the method further includes step S3020: The network device sends the valid time indication information to the terminal device. The terminal device determines the valid time of the first information based on the valid time indication information. In other words, the valid time is determined based on the valid time indication information from the network device. The valid-time information may include at least one of a valid periodicity, valid duration, and an initial offset of the valid time. The periodicity is a periodicity of the valid time; the duration is duration of the valid time in one periodicity; and the initial offset is an offset between a start moment of the valid time in one periodicity and a start moment of the periodicity to which the valid time belongs. It should be noted that the valid time indication information and the first information may alternatively be carried in a same message. In other words, step S3020 and step S301 are a same step. By performing step S3020 and step S3021, the network device may configure the valid time of the first information for the terminal device, and the terminal device may use the first information based on the valid time, to avoid a case in which the service characteristic has changed but previous transmission characteristic indication information is still valid, improve configuration flexibility of the first information, and optimize user experience. The network device appropriately configures the valid time indication information, and no longer needs to send additional signaling to indicate the terminal device to switch the transmission characteristic information, thereby reducing signaling consumption. Further, when the network device sends at least one piece of first information, the at least one piece of first information may correspond to at least one piece of valid-time information. For example, the network device may configure the valid-time information for the terminal device based on the valid time indication information. The valid-time information may be in a one-to-one correspondence with the at least one piece of first information. In other words, the network device may configure different first information in different time periods. Alternatively, one piece of valid-time information may correspond to a plurality of pieces of first information. In other words, a plurality of pieces of first information may be valid within same valid time. For example, a base station sends first information 1 to user equipment (UE), and valid time corresponding to the first information 1 is a first time period. The first information 1 indicates the first transmission direction state. In other words, the base station indicates the UE to receive DCI based on the first transmission direction state in the first time period. For example, the base station further sends first information 2 corresponding to a second time period to the UE, where the first information 2 indicates the first load state. In this case, the UE receives the DCI based on the first transmission direction state in the first time period, and receives DCI based on the first load state in the second time period. The network device may indicate both transmission direction information and/or service load information in a specific time period, or may indicate a plurality of different time periods and service transmission characteristic information in each time period. In different configuration manners of the valid-time information, a transmission mode can be adjusted more flexibly based on the service characteristic of the terminal device, to optimize user experience.

The foregoing describes content included in the first information and application manners of the network device and the terminal device. The following describes in detail a manner of sending the first information. Specifically, the first information may be carried in a radio resource control RRC message, or carried in a media access control control element MAC CE.

In a first possible implementation, the network device may configure the first information for the terminal device by using user-specific higher layer signaling. For example, the first information is carried in the RRC message. Specifically, the network device sends the RRC message to the terminal device, where the RRC message carries at least one piece of first information. Optionally, the at least one piece of first information may correspond to at least one piece of valid-time information. For configuration of the valid-time information, refer to related descriptions in step S3020 above. When the network device sends the valid time indication information to the terminal device, at least one piece of valid time indication information and the at least one piece of first information may be carried in a same message, or may be carried in different messages. Correspondingly, the terminal device receives the RRC message from the network device and determines the first information.

In a second possible implementation, the network device may transmit the first information to the terminal device through a media access control control element (MAC CE). Specifically, the network device sends the MAC CE to the terminal device, where the MAC CE includes the first information 1, which may also be understood as that the network device activates the first information through the MAC CE, and after receiving the MAC CE, the terminal device determines the first information 1, and receives DCI based on a service transmission characteristic indicated by the first information 1. There are two manners in which the terminal device determines that the first information 1 is invalid. In a first case, the network device further configures valid-time information corresponding to the first information 1 for the terminal device. For a configuration manner, refer to related descriptions in step S3020 above. Specifically, the MAC CE may be carried on a PDSCH. For example, when the first information indicates the second transmission direction state, the terminal device no longer receives DCI for scheduling the PDSCH after using the first information. In this case, the terminal device may be indicated, in a manner of configuring the valid time for the second information, to stop using the first information. In a second case, the network device may send a new MAC CE to the terminal device, where the new MAC CE carries new first information 2, to indicate the terminal device to receive DCI based on a new service transmission characteristic, or the new MAC CE indicates the terminal device to stop using the first information 1. After receiving the new MAC CE, the terminal device may restore to a transmission state used before the first information 1 is used. It may be understood that the new MAC CE indicates the terminal device to deactivate the first information 1. Compared with reconfiguration of the first information by using higher layer signaling, transmission efficiency of the MAC CE is higher. In addition, the valid-time information may not be configured, and activation and deactivation of the first information is dynamically implemented only through the MAC CE, to improve flexibility of the communication system.

In a third possible implementation, the network device may configure at least one piece of first information, for example, the first information 1 and the first information 2, for the terminal device by using higher layer signaling, and then activate or deactivate one of the at least one piece of first information through a MAC CE. For example, the base station sends an RRC message to the UE, where the RRC message carries N pieces of first information, including the first information 1, the first information 2, . . . , and first information N. The base station sends a MAC CE to the UE to indicate to activate the first information 1, and the UE receives DCI based on a transmission characteristic indicated by the activated first information 1. The base station may send, to the UE, a MAC CE to indicate to update the activated first information from the first information 1 to the first information 2, and the UE receives DCI based on a transmission characteristic indicated by the newly activated first information 2. Then, the base station sends a MAC CE to the UE to indicate to deactivate the first information 2, and the UE stops using the first information. The higher layer signaling and the MAC CE are used in combination, so that the network device may configure the service characteristic information only once, and then flexibly enable the first information through the MAC CE, to implement high-efficiency and low-consumption transmission control.

In a fourth possible implementation, the network device may transmit the first information to the terminal device by using first DCI. Specifically, the first DCI is carried on a PDCCH, and the first DCI carrying the first information may be DCI for scheduling a PDSCH or a PUSCH, UE-specific DCI, DCI indicating other information, for example, a DCI format 2_6 indicating energy saving information of the UE, or DCI dedicated to indicating the first information. Transmitting the first information by using the first DCI may also be understood as activating the first information by using the first DCI. For example, the network device sends the first DCI to the terminal device, where the first DCI includes the first information 1. After receiving the first DCI, the terminal device determines the first information 1, and receives subsequent DCI based on a service transmission characteristic indicated by the first information 1. There are two manners in which the terminal device determines that the first information 1 is invalid: configuring corresponding valid-time information, or indicating, by using second DCI, the terminal device to stop using the first information. For detailed descriptions of the two manners, refer to the method for using the MAC CE in the foregoing "second possible implementation". Compared with reconfiguration of the first information implemented by using the higher layer signaling or the MAC CE, the first DCI has highest transmission efficiency, fastest validation, and optimal flexibility, to improve communication efficiency of the communication system.

It may be understood that, in this embodiment of this application, flexible transmission of the first information can be implemented in the foregoing four possible implementations, and the first information may include at least one of the transmission direction information and the service load information each time the first information is activated, updated, or deactivated. Therefore, the DCI transmission mode can be flexibly and dynamically controlled based on the service characteristic, communication efficiency and resource utilization of the communication system can be improved, and user experience can be optimized.

For step S303, the terminal device performs transmission based on the first information by using the SPS resource. That the first information indicates a transmission direction state and/or a service load state may be understood as that the first information indicates a manner in which the terminal device detects the DCI, and also indicates to the terminal device to use or release of the SPS resource, or the terminal device determines the use manner of the SPS resource based on the transmission direction state and/or the service load state that are/is indicated by the first information.

Specifically, Table 2 is an example in which the first information indicates a DCI detect manner and an SPS resource use manner to the terminal device. When the first information indicates that the to-be-transmitted service of the terminal device is in the first transmission direction state (where there are many uplink services) or the second transmission direction state (where there are only uplink services), the first information indicates the terminal device to align the size of the DCI in the second format with the size of the DCI in the first format or detect only the DCI in the first format when detecting the DCI, and also indicates the terminal device to release the DL SPS resource. Similarly, when the first information indicates that the to-be-transmitted service of the terminal device is in the third transmission direction state (where there are many downlink services) or the fourth transmission direction state (where there are only downlink services), the first information indicates the terminal device to align the size of the DCI in the first format with the size of the DCI in the second format or detect only the DCI in the second format when detecting the DCI, and also indicates the terminal device to release the UL configured grant resource. Table 3 is another example in which the first information indicates a DCI detect manner and an SPS resource use manner to the terminal device. When the first information indicates that the service load information of the terminal device is in the first load state (the heavy-load state), the first information indicates the terminal device how to detect the DCI, and also indicates the terminal device to activate the DL SPS resource and the UL configured grant resource. When the first information indicates that the service load information of the terminal device is in the second load state (the light-load state), the first information indicates the terminal device to detect only the second-type DCI or detect the second-type DCI in the search space corresponding to the first-type DCI, and also indicates the terminal device to release/deactivate the DL SPS resource and the UL configured grant resource. It should be noted that, when the first information indicates the transmission direction state information and the service load information, use of the DL SPS resource or the UL configured grant resource should meet indications in both Table 2 and Table 3, that is, the terminal device can use the SPS resource only when both the transmission direction state and the service load state indicate that the SPS resource can be used. For example, when the first information indicates the first transmission direction state and the first load state, the terminal device deactivates the DL SPS resource, and may use/activate the UL configured grant resource. When the first information indicates the third transmission direction state and the second load state, the terminal device deactivates the DL SPS resource and the UL configured grant resource. The first information indicates use of the SPS resource, so that signaling overheads for the network device to indicate, by using the DCI or an RRC reconfiguration message, the terminal device to release the resource can be reduced, and system consumption can be reduced.

TABLE 2

Example in which first information indicates DCI transmission and SPS resource use

| Transmission direction information indicated by the first information | DCI detection | SPS resource use |
|---|---|---|
| First transmission direction state | DCI in a second format is aligned with DCI in a first format | Release or deactivate a DL SPS resource |
| Second transmission direction state | Detect only the DCI in the first format | |
| Third transmission direction state | The DCI in the first format is aligned with the DCI in the second format | Release or deactivate a UL configured grant resource |
| Fourth transmission direction state | Detect only the DCI in the second format | |
| Default transmission direction | Normally detect DCI | Default SPS resource use |

TABLE 3

Example in which first information indicates DCI transmission and SPS resource use

| Service load information indicated by the first information | DCI detection | SPS resource use |
|---|---|---|
| First load state | Detect only first-type DCI, or detect the first-type DCI in search space corresponding to second-type DCI | Default SPS resource use |
| Second load state | Detect only the second-type DCI, or detect the second-type DCI in search space corresponding to the first-type DCI | Release or deactivate a DL SPS resource and a UL configured grant resource |
| Default load state | Normally detect DCI | Default SPS resource use |

It may be understood that the network device may indicate both the transmission direction information, the service load information, and SPS resource use information by using the first information, to maximize utilization of an indication message, and improve communication efficiency of the communication system while adjusting the transmission mode based on the characteristic of the to-be-transmitted service of the terminal device. For example, as shown in Table 1, the first information may be a 3-bit indicator field, and eight different states of the field may respectively indicate combinations of the transmission direction indication information and the service load indication information. In addition, an SPS resource use method may be determined with reference to Table 2 and Table 3. In a possible implementation, when an SPS resource is valid in an SPS resource use method corresponding to the transmission direction indication information, and is also valid in an SPS resource use method corresponding to the service load indication information, it may be determined that the SPS resource of this type is valid. For example, when the indicator field is 000, an SPS resource use method corresponding to the first transmission direction state is that the DL SPS resource is invalid and the UL configured grant resource is valid, and an SPS resource use method corresponding to the first load state is that both the DL SPS resource and the UL configured grant resource are valid. Therefore, it may be determined that the SPS resource use method is that only the UL configured grant resource is valid when the indicator field is 000. According to the communication method provided in this embodiment of this application, the network device may indicate the transmission direction indication information, the service load indication information, and the SPS resource use method by using one field, to better flexibly adjust the communication method based on the characteristic of the to-be-transmitted service of the terminal device, reduce signaling overheads, and improve communication efficiency.

In a possible implementation, a correspondence between a characteristic of a transmission service, a DCI transmission mode, and a use manner of an SPS resource is predefined in a standard, for example, as shown in Table 2 and Table 3. In this case, the first information needs to indicate only the characteristic (the transmission direction information and/or the service load information) of the to-be-transmitted service, and the terminal device may determine the DCI transmission mode and the use manner of the SPS resource based on the first information, so that transmission consumption of control signaling can be reduced, and communication efficiency can be improved. In another possible implementation, the DCI transmission mode and the use manner of the SPS resource are separately indicated. It may be understood that the first information indicates only the DCI transmission mode, and the use manner of the SPS resource is indicated by using the second information. For a specific implementation, refer to related descriptions in Embodiment 2.

According to the communication method provided in this application, the network device may indicate the characteristic of the to-be-transmitted service by using the first information, where the first information includes the transmission direction information and/or the service load information, and the first information may further indicate the DCI transmission mode and the use manner of the SPS resource. Correspondingly, after receiving the first information, the terminal device detects the DCI based on the first information, and/or uses the SPS resource based on the first information. The network device and the terminal device may exchange the DCI transmission mode and the use manner of the SPS resource by using one piece of first information, to adjust the communication mode based on the service transmission characteristic, optimize user experience, and improve resource utilization and communication efficiency of the communication system.

Embodiment 2

Figure 6:
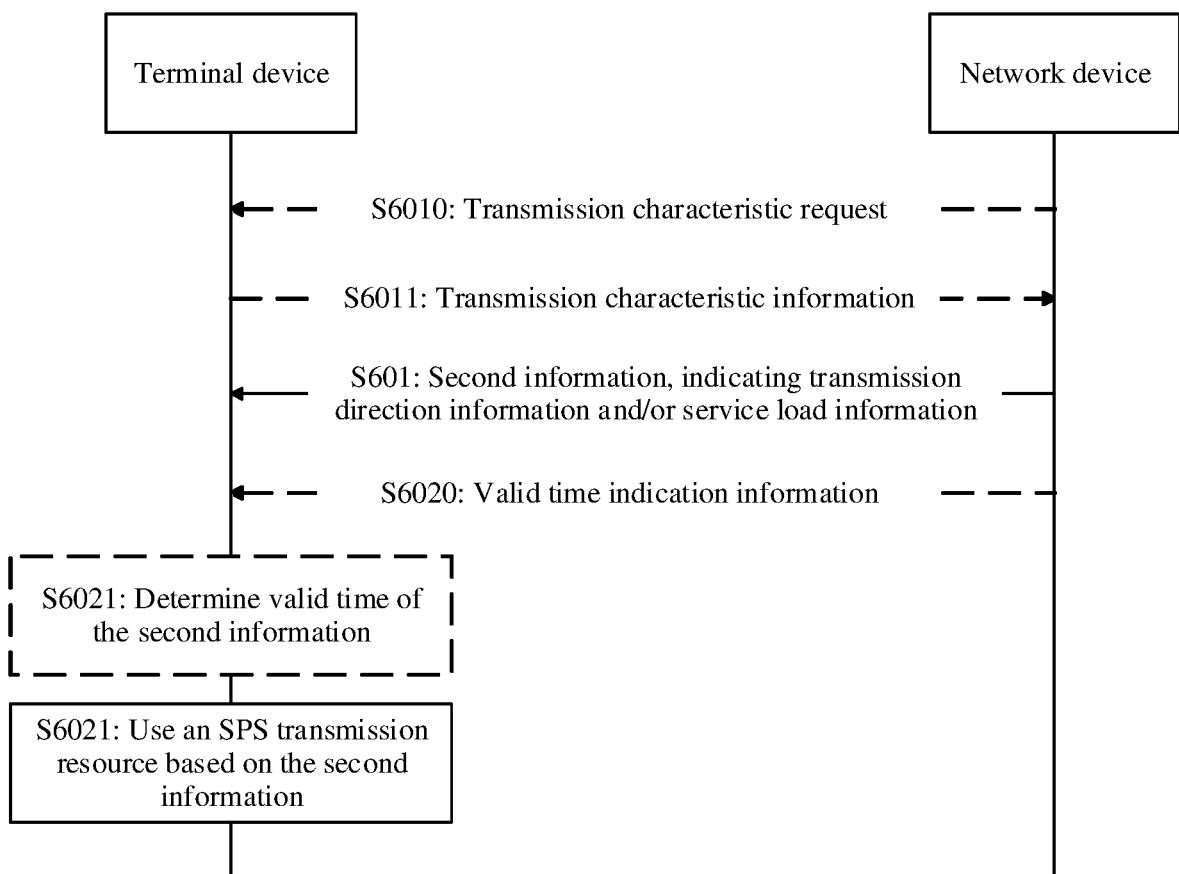
FIG. 6 is a flowchart of another communication method according to an embodiment of this application.

In the foregoing embodiment, it is described that a network device may indicate a DCI transmission mode by using first information. The first information includes transmission direction information and/or service load information. In addition, the first information may further indicate a use manner of an SPS resource, as described above. Alternatively, the DCI transmission mode and the use manner of the SPS resource may be separately indicated, to more flexibly indicate communication transmission of a terminal device. A communication method provided in this embodiment describes how to indicate the use manner of the SPS resource by using second information. It should be noted that Embodiment 2 may be used independently, or may be used in combination with Embodiment 1. For ease of description, an example in which the method is performed by the network device and the terminal device is used below. Because the example in which the method is applied to the network architecture shown in FIG. 2 is used in this embodiment, the following network device may be the network device in the network architecture shown in FIG. 2, and the following terminal device may be the terminal device in the network architecture shown in FIG. 2. As shown in FIG. 6, the communication method provided in this embodiment of this application includes steps S601 and S602.

S601: The network device sends the second information to the terminal device, where the second information indicates the use manner of the SPS resource. Correspondingly, the terminal device receives the second information from the network device.

S602: The terminal device performs transmission based on the second information by using the SPS resource.

The SPS resource is a periodic resource. When the SPS resource is valid, the terminal device only needs to perform transmission based on a configuration of higher layer signaling by using the SPS resource, and does not require DCI scheduling. SPS transmission may be used for low-latency transmission or long-term and continuous transmission based on a scheduling-free characteristic of the SPS resource, to improve communication efficiency. The network device may determine, based on a characteristic of a to-be-transmitted service of the terminal device, whether to indicate the terminal device to release a specific type of SPS resource or release all SPS resources, to release more resources to another terminal device, thereby implementing flexible scheduling in a communication system.

For step S601, the network device sends the second information to the terminal device, where the second information indicates the use manner of the SPS resource. Correspondingly, the terminal device receives the second information from the network device.

The second information indicates the manner of using the SPS resource by the terminal device. Specifically, the second information may indicate at least one of the following: first indication information, indicating the terminal device to release, deactivate, or skip using a DL SPS resource; second indication information, indicating the terminal device to release, deactivate, or skip using a UL configured grant resource; third indication information, indicating the terminal device to release, deactivate, or skip using the DL SPS resource and the UL configured grant resource; and default indication information, indicating the terminal device to activate or use the DL SPS resource and the UL configured grant resource.

Optionally, the second information is determined based on the characteristic of the to-be-transmitted service of the terminal device. The "release or skip using" may be understood as deactivating or releasing a resource. The SPS resource is a periodic transmission resource configured by the network device for the terminal device. When the network device determines that data is not transmitted by using the DL SPS resource in a next period of time, the terminal device does not need to receive downlink data by using the DL SPS resource either. Therefore, the DL SPS resource can be released to save a transmission resource of a downlink control channel. Releasing a resource may also be understood as skip using the resource for transmission. Similarly, the network device may indicate, based on the characteristic of the to-be-transmitted service of the terminal device, the terminal device to release or deactivate the UL configured grant resource, to improve overall resource utilization of the communication system.

Optionally, before step S601, the method further includes step S601: The terminal device sends transmission characteristic information to the network device, where the transmission characteristic information indicates the characteristic of the to-be-transmitted service of the terminal device. For example, further, the network device may determine the second information based on the transmission characteristic information from the terminal device. Optionally, before step S601, the method further includes step S6010: The network device sends a transmission characteristic request to the terminal device, where the transmission characteristic request indicates the terminal device to report the transmission characteristic information. Alternatively, S6010 is as follows: The network device sends capability information to the terminal device, where the capability information indicates that the network device supports adjustment of the use manner of the SPS resource based on the characteristic of the to-be-transmitted service of the terminal device. After receiving the capability information, the terminal device may perform step S6011. For specific implementations of steps S6010 and S6011, refer to related descriptions in step S3010 and step S3011. By performing steps S6010 and S6011, the network device and the terminal device may exchange the characteristic information of the to-be-transmitted service of the terminal device, so that the network device can optimize the use manner of the SPS resource more accurately based on the service characteristic, to improve resource utilization of the communication system.

It should be noted that step S601 and steps S6010 and S6011 may be sent for a plurality of times. The network device may change SPS resource use indication information based on a real-time service characteristic by sending the second information for a plurality of times, to flexibly adjust a scheduling manner based on the service characteristic, and improve communication efficiency of the terminal device.

Optionally, before step S602, the method further includes step S6021: The terminal device determines valid time of the second information. In other words, step S602 is as follows: The terminal device determines use of the SPS transmission resource based on the second information within the valid time. When the valid time expires, the terminal device may restore use of an original SPS resource, or the terminal device may restore to an SPS use state previously indicated by the network device. Specifically, when valid time indication information is from the network device, the valid time is predefined in a standard, or the valid time is preconfigured, further optionally, before step S6021, the method further includes step S6020: The network device sends the valid time indication information to the terminal device. A correspondence between the valid time indication information and the second information may be in a one-to-one correspondence, or may be in a one-to-many correspondence. For specific implementations of step S6021 and step S6020, refer to related descriptions in step S3021 and step S3020. For brevity of description, details are not described herein again.

In a possible implementation, the network device may indicate both the first information and the second information. Specifically, the network device sends the first information and the second information to the terminal device, where the first information indicates the DCI transmission mode, and the second information indicates the manner of using the SPS resource by the terminal device. The terminal device receives DCI based on the first information, and uses the SPS resource based on the second information. For example, when a base station determines that all to-be-transmitted services of UE are uplink services, the base station may send the first information to the UE to indicate a second transmission direction state, and send the second information to indicate the terminal device to release, deactivate, or skip using the DL SPS resource. After receiving the first information and the second information, the UE may release the DL SPS resource and receive only DCI in a first format. In other words, the UE does not need to detect DCI in a second format, and does not occupy the DL SPS resource, to release more resources to another terminal device. According to the communication method provided in this application, the network device can flexibly indicate, based on a service requirement, the terminal device how to use the SPS resource. The network device may send the first information and the second information to the terminal device, to respectively indicate the terminal device how to perform DCI detection and use the SPS resource. It should be noted that the first information and the second information may be carried in a same message or different messages.

In a possible design, valid time of the first information is the same as the valid time of the second information. Further, the valid time of the first information and the valid time of the second information may be indicated by same valid time indication information. Specifically, the network device sends a first message to the terminal device, where the first message includes the first information, the second information, and first valid time indication information, and the first valid time indication information indicates the valid time of the first information and the valid time of the second information. After receiving the first message, the terminal device determines first valid time based on the first valid time indication information, receives DCI based on the first information within the first valid time, and uses the SPS resource based on the second information within the first valid time.

The second information may be carried in a radio resource control RRC message, or carried in a media access control control element MAC CE. For a manner of sending the second information, refer to the four possible implementations of the manner of sending the first information in Embodiment 1. Details are not described herein again.

According to the communication method provided in this embodiment of this application, the network device may indicate an SPS resource use method to the terminal device by using the second information, to improve resource utilization. The network device may send the first information and the second information to the terminal device based on the to-be-transmitted characteristic of the terminal device. Further, the valid time of the first information and/or the valid time of the second information may be configured by using the valid time indication information, to flexibly control communication transmission of the terminal device based on the service characteristic, optimize user experience, and improve resource utilization of the communication system.

Figure 7:
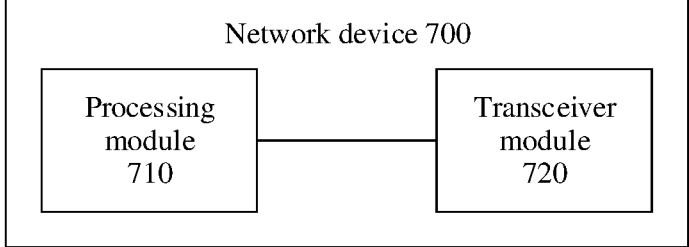
FIG. 7 is a schematic block diagram of a network device according to an embodiment of this application.

FIG. 7 is a schematic block diagram of a communication apparatus 700 according to an embodiment of this application. For example, the communication apparatus 700 is a network device 700.

The network device 700 includes a processing module 710 and a transceiver module 720. For example, the network device 700 may be a network device, or may be a chip used in the network device or another combined device or component that has a function of the network device. When the network device 700 is the network device, the transceiver module 720 may be a transceiver, where the transceiver may include an antenna, a radio frequency circuit, and the like; the processing module 710 may be a processor, for example, a baseband processor, where the baseband processor may include one or more central processing units (central processing units, CPUs). When the network device 700 is the component that has the function of the network device, the transceiver module 720 may be a radio frequency unit, and the processing module 710 may be a processor, for example, a baseband processor. When the network device 700 is the chip system, the transceiver module 720 may be an input/output interface of the chip (for example, a baseband chip), and the processing module 710 may be a processor of the chip system, and may include one or more central processing units. It should be understood that the processing module 710 in this embodiment of this application may be implemented as a processor or a processor-related circuit component, and the transceiver module 720 may be implemented as a transceiver or a transceiver-related circuit component.

For example, the processing module 710 may be configured to perform all operations that are performed by the network device in the embodiment shown in FIG. 3 or FIG. 6 other than receiving and sending operations, and/or configured to support another process of the technology described in this specification. The transceiver module 720 may be configured to perform all receiving operations performed by the network device in the embodiment shown in FIG. 3 or FIG. 6, for example, S301, S302, S601, and S602, and/or configured to support another process of the technology described in this specification.

In addition, the transceiver module 720 may be one functional module. The functional module can implement both a sending operation and a receiving operation. For example, the transceiver module 720 may be configured to perform all sending operations and receiving operations performed by the network device in the embodiment shown in FIG. 3. For example, when a sending operation is performed, it may be considered that the transceiver module 720 is a sending module. When a receiving operation is performed, it may be considered that the transceiver module 720 is a receiving module. Alternatively, the transceiver module 720 may include two functional modules. The transceiver module 720 may be considered as a general term of the two functional modules, and the two functional modules are respectively a sending module and a receiving module. The sending module is configured to implement a sending operation. For example, the sending module may be configured to perform all sending operations performed by the network device in any implementation of the embodiment shown in FIG. 3 or FIG. 6. The receiving module is configured to implement a receiving operation. For example, the receiving module may be configured to perform all receiving operations performed by the network device in the embodiment shown in FIG. 3 or FIG. 6.

For example, the transceiver module 720 is configured to send first information and/or second information, where the first information indicates transmission direction information and/or service load information, and the second information indicates a use manner of an SPS resource.

The transceiver module 720 may be further configured to send DCI to the terminal device.

In an optional implementation, the transmission direction information indicates at least one of the following: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission.

In an optional implementation, alignment methods include zero padding and truncation.

In an optional implementation, the service load information indicates at least one of the following: a first load state, indicating that service load of the terminal device is heavy load; and a second load state, indicating that service load of the terminal device is light load.

In an optional implementation, when the first information indicates the second transmission direction state, the DCI in the first format does not include a DCI format indicator field; and/or when the first information indicates the fourth transmission direction state, the DCI in the second format does not include a DCI format indicator field.

In an optional implementation, the service load information indicates at least one of the following: a first load state, indicating that service load of the terminal device is heavy load; and a second load state, indicating that service load of the terminal device is light load.

In an optional implementation, when the first information indicates the first load state, the network device sends only first-type DCI, or sends the first-type DCI in search space corresponding to second-type DCI; and/or when the first information indicates the second load state, the network device sends only the second-type DCI, or sends the second-type DCI in search space corresponding to the first-type DCI; and/or when the first information indicates a default load state, the network device sends the first-type DCI in the search space corresponding to the first-type DCI, and/or sends the second-type DCI in the search space corresponding to the second-type DCI, where the first-type DCI and the second-type DCI are in different formats, and an indicator field included in the second-type DCI and a size of the indicator field are predefined.

In an optional implementation, the transceiver module 720 is further configured to send valid time indication information to the terminal device. The valid time indication information may indicate at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the first information is carried in a radio resource control RRC message, or carried in a media access control control element MAC CE.

Figure 8:
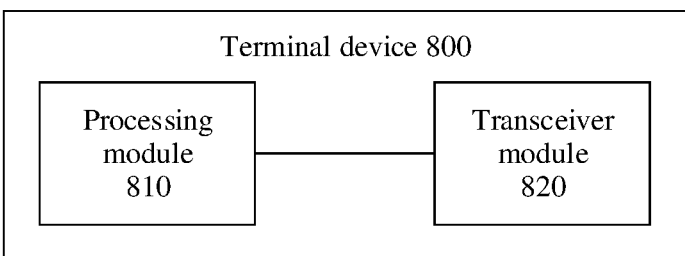
FIG. 8 is a schematic block diagram of a terminal device according to an embodiment of this application.

FIG. 8 is a schematic block diagram of a communication apparatus 800 according to an embodiment of this application. For example, the communication apparatus 800 is a terminal device 800.

The terminal device 800 includes a processing module 810 and a transceiver module 820. For example, the terminal device 800 may be a network device, or may be a chip used in the terminal device or another combined device or component that has a function of the terminal device. When the terminal device 800 is the terminal device, the transceiver module 820 may be a transceiver, where the transceiver may include an antenna, a radio frequency circuit, and the like; the processing module 810 may be a processor, for example, a baseband processor, where the baseband processor may include one or more central processing units (CPUs). When the terminal device 800 is the component that has the function of the terminal device, the transceiver module 820 may be a radio frequency unit, and the processing module 810 may be a processor, for example, a baseband processor. When the terminal device 800 is the chip system, the transceiver module 820 may be an input/output interface of the chip (for example, a baseband chip), and the processing module 810 may be a processor of the chip system, and may include one or more central processing units. It should be understood that, in this embodiment of this application, the processing module 810 may be implemented as a processor or a processor-related circuit component, and the transceiver module 820 may be implemented as a transceiver or a transceiver-related circuit component.

For example, the processing module 810 may be configured to perform all operations, such as S602, that are performed by the terminal device in the embodiment shown in FIG. 3 or FIG. 6 other than receiving and sending operations, and/or configured to support another process of the technology described in this specification. The transceiver module 820 may be configured to perform all receiving operations performed by the terminal device in the embodiment shown in FIG. 3 or FIG. 6, for example, S301, S302, and S601, and/or configured to support another process of the technology described in this specification.

In addition, the transceiver module 820 may be one functional module. The functional module can implement both a sending operation and a receiving operation. For example, the transceiver module 820 may be configured to perform all sending operations and receiving operations performed by the terminal device in the embodiment shown in FIG. 3 or FIG. 6. For example, when a sending operation is performed, it may be considered that the transceiver module 820 is a sending module. When a receiving operation is performed, it may be considered that the transceiver module 820 is a receiving module. Alternatively, the transceiver module 820 may include two functional modules. The transceiver module 820 may be considered as a general term of the two functional modules, and the two functional modules are respectively a sending module and a receiving module. The sending module is configured to implement a sending operation. For example, the sending module may be configured to perform all sending operations performed by the terminal device in any implementation of the embodiment shown in FIG. 3 or FIG. 6. The receiving module is configured to implement a receiving operation. For example, the receiving module may be configured to perform all receiving operations performed by the terminal device in the embodiment shown in FIG. 3 or FIG. 6.

For example, the transceiver module 820 is configured to receive first information and/or second information, where the first information indicates transmission direction information and/or service load information, and the second information indicates a use manner of an SPS resource.

The processing module 810 is configured to detect DCI through the transceiver module 820.

In an optional implementation, the transmission direction information indicates at least one of the following: a first transmission direction state, indicating that a size of DCI in a second format is aligned with a size of DCI in a first format; a second transmission direction state, indicating the terminal device to receive only the DCI in the first format; a third transmission direction state, indicating that the size of the DCI in the first format is aligned with the size of the DCI in the second format; a fourth transmission direction state, indicating the terminal device to receive only the DCI in the second format; and a default transmission direction state, indicating the terminal device to receive the DCI in the first format and the DCI in the second format, where the DCI in the first format is DCI for scheduling uplink transmission, and the DCI in the second format is DCI for scheduling downlink transmission.

In an optional implementation, alignment methods include zero padding and truncation.

In an optional implementation, the service load information indicates at least one of the following: a first load state, indicating that service load of the terminal device is heavy load; and a second load state, indicating that service load of the terminal device is light load.

In an optional implementation, when the first information indicates the second transmission direction state, the DCI in the first format does not include a DCI format indicator field; and/or when the first information indicates the fourth transmission direction state, the DCI in the second format does not include a DCI format indicator field.

In an optional implementation, the service load information indicates at least one of the following: a first load state, indicating that service load of the terminal device is heavy load; and a second load state, indicating that service load of the terminal device is light load.

In an optional implementation, when the terminal device is in the first load state, the terminal device detects only first-type DCI, or detects the first-type DCI in search space corresponding to second-type DCI; and/or when the terminal device is in the second load state, the terminal device detects only the second-type DCI, or detects the second-type DCI in search space corresponding to the first-type DCI; and/or when the terminal device is in a default load state, the terminal device detects the first-type DCI in the search space corresponding to the first-type DCI, and/or detects the second-type DCI in the search space corresponding to the second-type DCI, where the first-type DCI and the second-type DCI are in different formats, and an indicator field included in the second-type DCI and a size of the indicator field are predefined.

In an optional implementation, the transceiver module 820 is further configured to receive valid time indication information from the network device. The valid time indication information may indicate at least one of a periodicity, duration, and an initial offset, where the periodicity is a periodicity of the valid time; the duration is duration of the valid time in one periodicity; and the initial offset is an offset between a start moment of the valid time in one periodicity and a start moment of the periodicity to which the valid time belongs.

In an optional implementation, the first information is carried in a radio resource control RRC message, or carried in a media access control control element MAC CE.

An embodiment of this application further provides a communication apparatus. The communication apparatus may be a terminal device, or may be a circuit. The communication apparatus may be configured to perform an action performed by the terminal device in the foregoing method embodiments.

Figure 9:
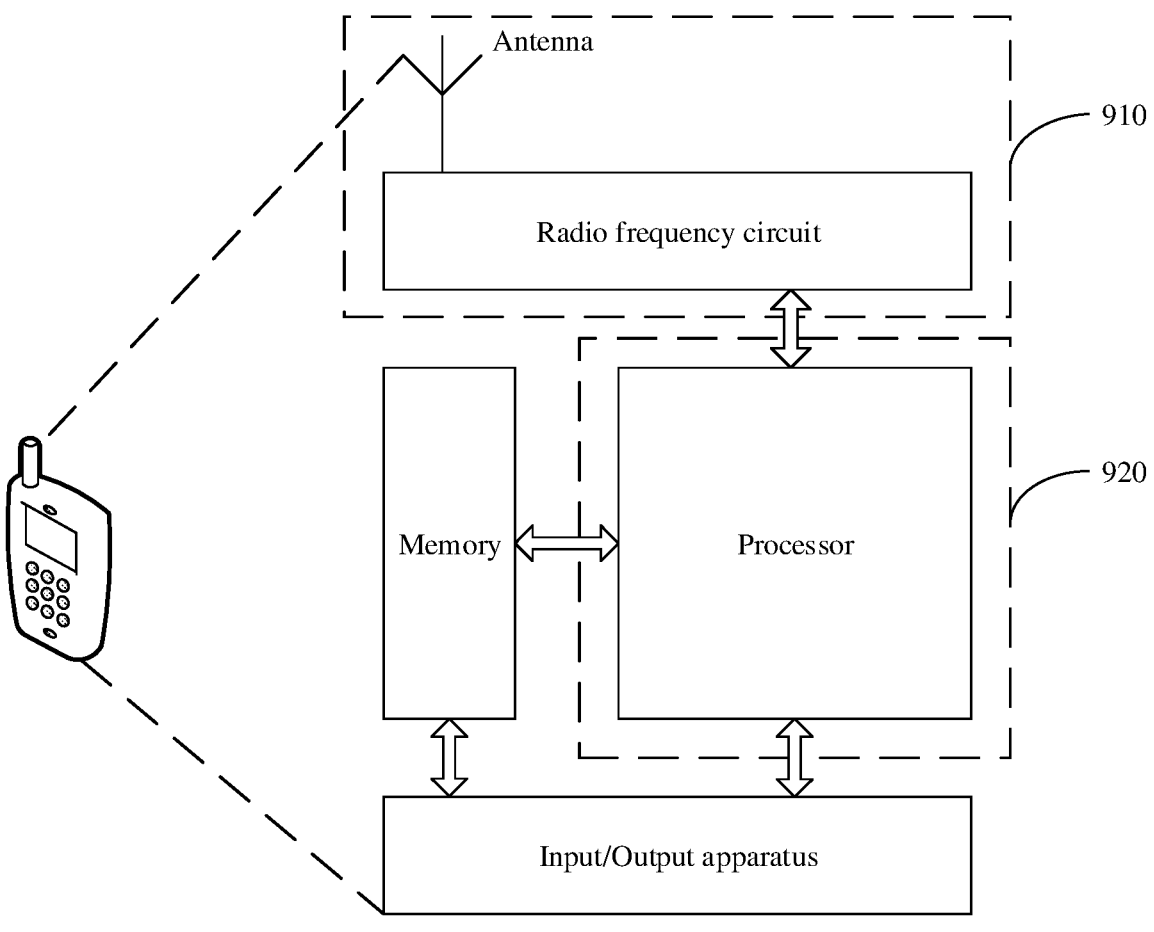
FIG. 9 is a schematic block diagram of a communication apparatus according to an embodiment of this application.

When the communication apparatus is a terminal device, FIG. 9 is a simplified schematic diagram of a structure of the terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/ output apparatus, such as a touchscreen, a display, or a keyboard, is mainly configured to: receive data input by a user and output data to the user. It should be noted that terminal devices of some types may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 9, the terminal device includes a transceiver unit 910 and a processing unit

920. The transceiver unit may also be referred to as a transceiver machine, a transceiver, a transceiver apparatus, or the like. The processing unit may also be referred to as a processor, a processing board, a processing module, a processing apparatus, or the like. Optionally, a component for implementing a receiving function in the transceiver unit 910 may be considered as a receiving unit, and a component for implementing a sending function in the transceiver unit 910 may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 910 is configured to perform a sending operation and a receiving operation on a terminal device side in the foregoing method embodiments, and the processing unit 920 is configured to perform an operation other than the sending operation and the receiving operation of the terminal device in the foregoing method embodiments.

For example, in an implementation, the processing unit 920 may be configured to perform all operations, such as S602, that are performed by the terminal device in the embodiment shown in FIG. 3 or FIG. 6 other than receiving and sending operations, and/or configured to support another process of the technology described in this specification. The transceiver unit 910 may be configured to perform all receiving operations performed by the terminal device in the embodiment shown in FIG. 3 or FIG. 6, for example, S301, S302, and S601, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
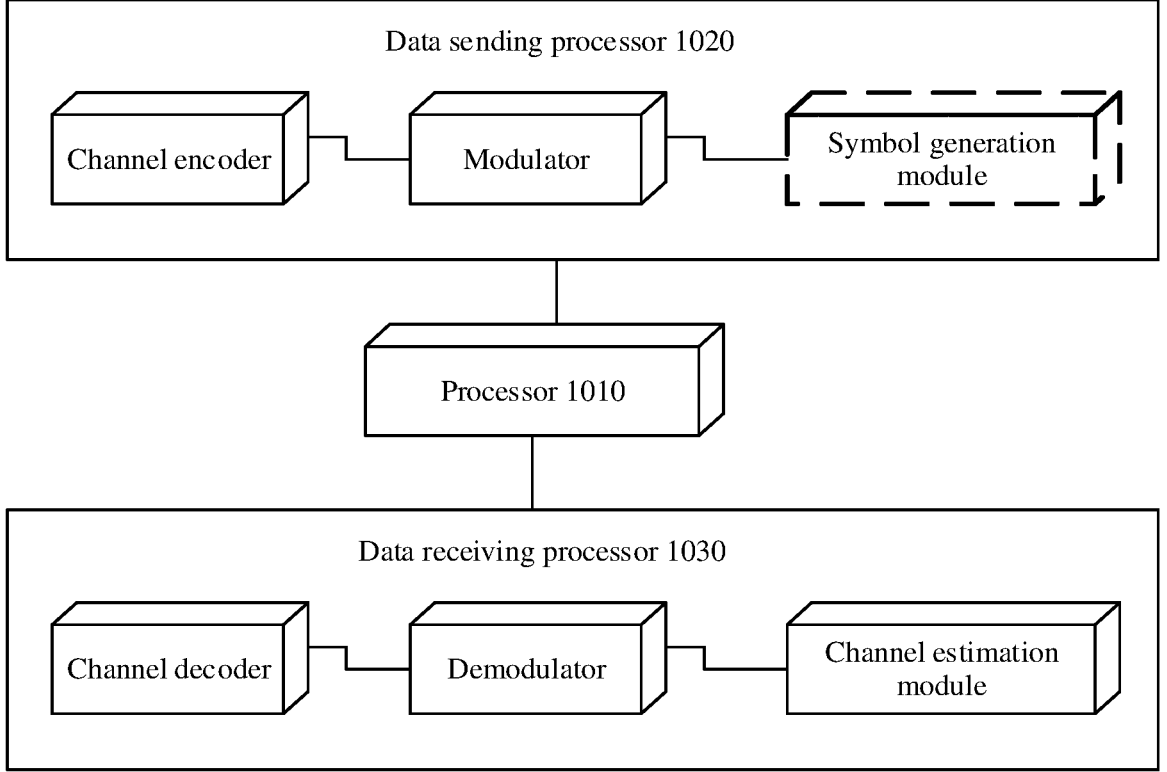
FIG. 10 is another schematic block diagram of a communication apparatus according to an embodiment of this application.

When the communication apparatus in this embodiment is a terminal device, refer to a device shown in FIG. 10. In an example, the device may implement a function similar to that of the processing module 810 in FIG. 8. In FIG. 10, the device includes a processor 1010, a data sending processor 1020, and a data receiving processor 1030. The processing module 810 in the foregoing embodiment may be the processor 1010 in FIG. 10, and implement a corresponding function. The transceiver module 820 in the foregoing embodiment may be the data sending processor 1020 and/or the data receiving processor 1030 in FIG. 10, and implement a corresponding function. Although FIG. 10 shows a channel encoder and a channel decoder, it may be understood that the modules do not constitute a limitation on this embodiment, but are merely examples.

Figure 11:
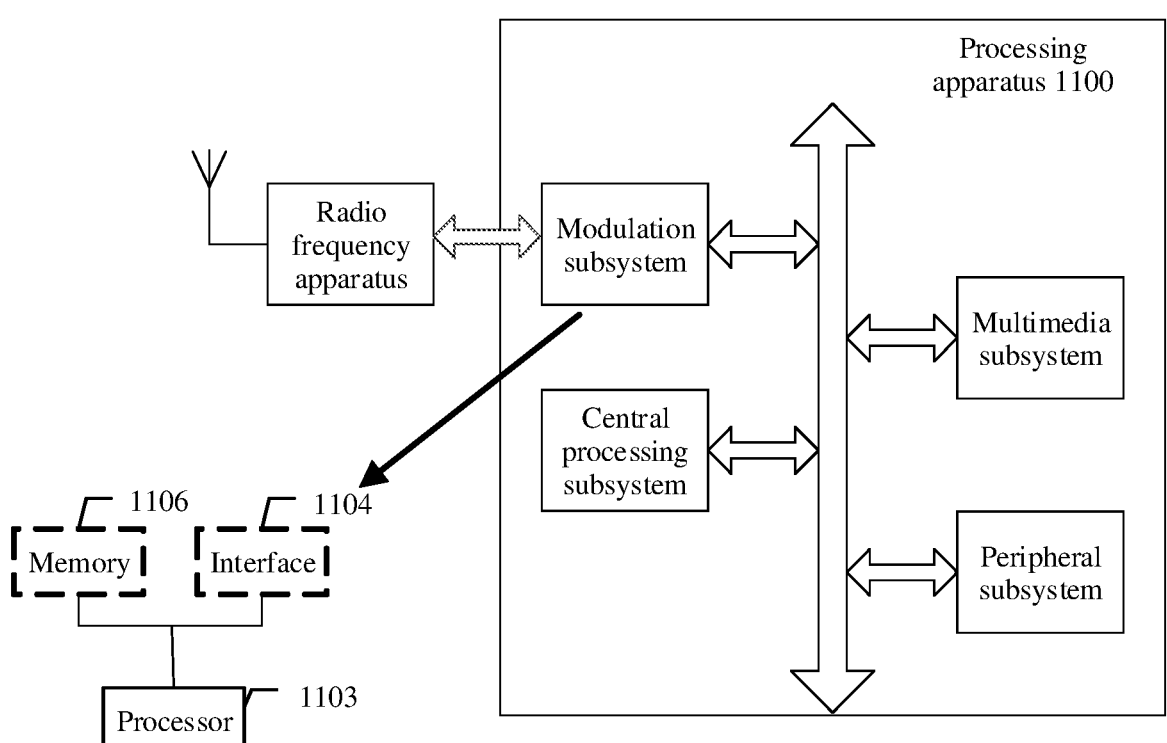
FIG. 11 is still another schematic block diagram of a communication apparatus according to an embodiment of this application.

FIG. 11 shows another form of this embodiment. A processing apparatus 1100 includes modules such as a modulation subsystem, a central processing subsystem, and a peripheral subsystem. The communication apparatus in this embodiment may be used as the modulation subsystem. Specifically, the modulation subsystem may include a processor 1103 and an interface 1104. The processor 1103 implements a function of the foregoing processing module 810, and the interface 1104 implements a function of the foregoing transceiver module 820. In another variation, the modulation subsystem includes a memory 1106, a processor 1103, and a program that is stored in the memory 1106 and that is executable on the processor. When executing the program, the processor 1103 implements the method on the terminal device side in the foregoing method embodiments. It should be noted that the memory 1106 may be nonvolatile or may be volatile, and may be located inside the modulation subsystem or in the processing apparatus 1100, provided that the memory 1106 can be connected to the processor 1103.

Figure 12:
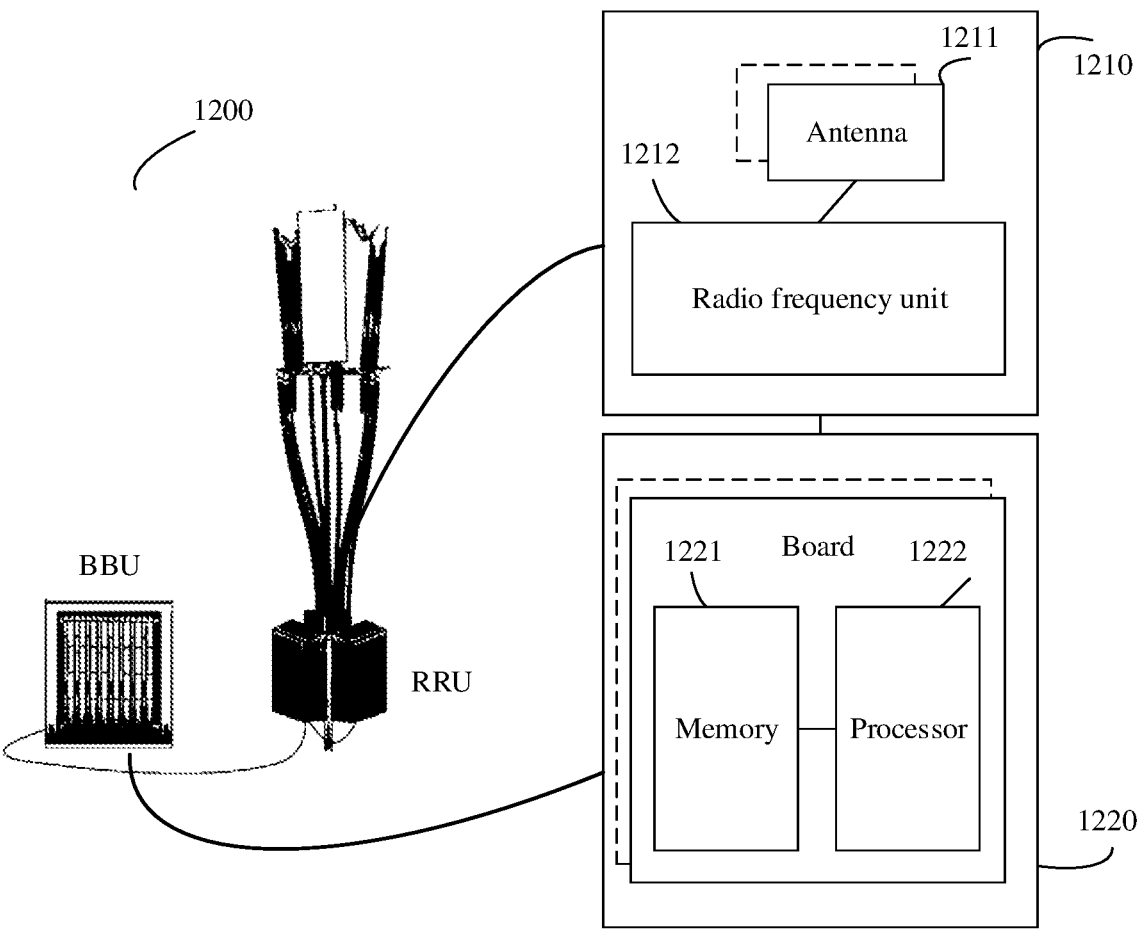
FIG. 12 is yet another schematic block diagram of a communication apparatus according to an embodiment of this application.

When the apparatus in this embodiment of this application is a network device, the apparatus may be that shown in FIG. 12. An apparatus 1200 includes one or more radio frequency units, such as a remote radio unit (RRU) 1210 and one or more baseband units (BBUs) (which may also be referred to as a digital unit (DU)) 1220. The RRU 1210 may be referred to as a transceiver module. The transceiver module may include a sending module and a receiving module, or the transceiver module may be a module that can implement sending and receiving functions. The transceiver module may correspond to the transceiver module 720 in FIG. 7. Optionally, the transceiver module may also be referred to as a transceiver machine, a transceiver circuit, a transceiver, or the like, and may include at least one antenna 1211 and a radio frequency unit 1212. The RRU 1210 is mainly configured to: receive and send a radio frequency signal, and perform conversion between the radio frequency signal and a baseband signal. For example, the RRU 1210 is configured to send indication information to a terminal device. The BBU 1210 is mainly configured to: perform baseband processing, control a base station, and the like. The RRU 1210 and the BBU 1220 may be physically disposed together, or may be physically disposed separately, namely, a distributed base station.

The BBU 1220 is a control center of the base station, and may also be referred to as a processing module. The BBU 1220 may correspond to the processing module 710 in FIG. 7, and is mainly configured to implement a baseband processing function such as channel coding, multiplexing, modulation, or spreading. For example, the BBU (the processing module) may be configured to control the base station to perform the operation procedure related to the network device in the foregoing method embodiments, for example, generate the foregoing indication information.

In an example, the BBU 1220 may include one or more boards, and a plurality of boards may jointly support a radio access network (for example, an LTE network) in a single access standard, or may separately support radio access networks (for example, an LTE network, a 5G network, or another network) in different access standards. The BBU 1220 further includes a memory 1221 and a processor 1222. The memory 1221 is configured to store necessary instructions and data. The processor 1222 is configured to control the base station to perform a necessary action, for example, configured to control the base station to perform the operation procedure related to the network device in the foregoing method embodiments. The memory 1221 and the processor 1222 may serve one or more boards. In other words, a memory and a processor may be disposed on each board. Alternatively, a plurality of boards may share a same memory and a same processor. In addition, a necessary circuit may further be disposed on each board.

An embodiment of this application provides a communication system. A first communication system may include the terminal device in the embodiment shown in FIG. 3 and the network device in the embodiment shown in FIG. 3 or FIG. 6. The terminal device is, for example, the terminal device 800 in FIG. 8. The network device is, for example, the network device 700 in FIG. 7.

An embodiment of this application further provides a computer-readable storage medium. The computer-readable storage medium stores a computer program. When the computer program is executed by a computer, the computer may implement a procedure related to the network device in the embodiment shown in FIG. 3 or FIG. 6 provided in the foregoing method embodiments.

An embodiment of this application further provides a computer-readable storage medium. The computer-readable storage medium is configured to store a computer program. When the computer program is executed by a computer, the computer may implement a procedure related to the terminal device in the embodiment shown in FIG. 3 or FIG. 6 provided in the foregoing method embodiments.

An embodiment of this application further provides a computer program product. The computer program product is configured to store a computer program. When the computer program is executed by a computer, the computer may implement a procedure related to the network device in the embodiment shown in FIG. 3 or FIG. 6 provided in the foregoing method embodiments.

An embodiment of this application further provides a computer program product. The computer program product is configured to store a computer program. When the computer program is executed by a computer, the computer may implement a procedure related to the terminal device in the embodiment shown in FIG. 3 or FIG. 6 provided in the foregoing method embodiments.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but not limited to these memories and any memory of another appropriate type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some characteristics may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in embodiments of this application. The foregoing computer-readable storage medium may be any usable medium that can be accessed by a computer. By way of example but not limitation, the computer-readable medium may include a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of instructions or a data structure and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
receiving, by a terminal device, first information from a network device, wherein the first information indicates transmission direction information or service load information; and
receiving, by the terminal device, downlink control information (DCI) from the network device based on the first information;
wherein the transmission direction information indicates at least one of the following:
a first transmission direction state, indicating that a size of DCI in a second format is aligned with a size of DCI in a first format;
a second transmission direction state, indicating to the terminal device to receive only the DCI in the first format;
a third transmission direction state, indicating that the size of the DCI in the first format is aligned with the size of the DCI in the second format;
a fourth transmission direction state, indicating to the terminal device to receive only the DCI in the second format; or
a default transmission direction state, indicating to the terminal device to receive the DCI in the first format and the DCI in the second format; and
wherein the DCI in the first format is DCI that schedules an uplink transmission, and the DCI in the second format is DCI that schedules a downlink transmission; and
wherein alignment methods comprise zero padding and truncation.

2. The method according to claim 1, wherein:
when the first information indicates the second transmission direction state, the DCI in the first format does not comprise a DCI format indicator field.

3. The method according to claim 1, wherein the service load information indicates at least one of the following:
a first load state, indicating that a service load of the terminal device is a heavier load than a second load state; and
the second load state, indicating that a service load of the terminal device is a lighter load than the first load state.

4. The method according to claim 3, wherein:
when the terminal device is in the first load state, the terminal device detects only first-type DCI, or detects the first-type DCI in a search space corresponding to second-type DCI; or
when the terminal device is in the second load state, the terminal device detects only the second-type DCI, or detects the second-type DCI in a search space corresponding to the first-type DCI; or when the terminal device is in a default load state, the terminal device detects the first-type DCI in the search space corresponding to the first-type DCI, or detects the second-type DCI in the search space corresponding to the second-type DCI; and wherein the first-type DCI and the second-type DCI are in different formats, and an indicator field comprised in the second-type DCI and a size of the indicator field are predefined.

5. The method according to claim 1, wherein receiving DCI from the network device based on the first information comprises:

receiving the DCI from the network device based on the first information within a valid time.

6. The method according to claim 5, wherein the valid time is determined based on valid time indication information from the network device.

7. The method according to claim 6, wherein the valid time indication information indicates at least one of a periodicity, duration, or an initial offset; and wherein the periodicity is a periodicity of the valid time, the duration is duration of the valid time in one period, and the initial offset is an offset between a start moment of the valid time in one period and a start moment of the period to which the valid time belongs.

8. The method according to claim 1, further comprising:

sending transmission characteristic information to the network device, wherein the transmission characteristic information indicates a characteristic of a to-be-transmitted service of the terminal device.

9. The method according to claim 1, wherein the first information is carried in a radio resource control (RRC) message, or is carried in a media access control control element (MAC CE).

10. The method according to claim 1, wherein:

when the first information indicates the fourth transmission direction state, the DCI in the second format does not comprise a DCI format indicator field.

11. An apparatus, wherein the apparatus is a terminal device or a chip in the terminal device, and the apparatus comprises:

a transceiver, configured to receive first information from a network device, wherein the first information indicates transmission direction information or service load information;

at least one processor; and a non-transitory computer-readable storage medium storing instructions that are executable by the at least one processor, the instructions including instructions for:

receiving downlink control information (DCI) from the network device based on the first information;

wherein the transmission direction information indicates at least one of the following:

a first transmission direction state, indicating that a size of DCI in a second format is aligned with a size of DCI in a first format;

a second transmission direction state, indicating to the terminal device to receive only the DCI in the first format;

a third transmission direction state, indicating that the size of the DCI in the first format is aligned with the size of the DCI in the second format;

a fourth transmission direction state, indicating to the terminal device to receive only the DCI in the second format; or

a default transmission direction state, indicating to the terminal device to receive the DCI in the first format and the DCI in the second format; and wherein the DCI in the first format is DCI that schedules an uplink transmission, and the DCI in the second format is DCI that schedules a downlink transmission; and wherein alignment methods comprise zero padding and truncation.

12. The apparatus according to claim 11, wherein:

when the first information indicates the second transmission direction state, the DCI in the first format does not comprise a DCI format indicator field.

13. The apparatus according to claim 11, wherein the service load information indicates at least one of the following:

a first load state, indicating that a service load of the terminal device is a heavier load than a second load state; or the second load state, indicating that a service load of the terminal device is a lighter load than the first load state.

14. The apparatus according to claim 13, wherein:

when the terminal device is in the first load state, the terminal device detects only first-type DCI, or detects the first-type DCI in search space corresponding to second-type DCI; or when the terminal device is in the second load state, the terminal device detects only the second-type DCI, or detects the second-type DCI in search space corresponding to the first-type DCI; or when the terminal device is in a default load state, the terminal device detects the first-type DCI in the search space corresponding to the first-type DCI, or detects the second-type DCI in the search space corresponding to the second-type DCI; and wherein the first-type DCI and the second-type DCI are in different formats, and an indicator field comprised in the second-type DCI and a size of the indicator field are predefined.

15. The apparatus according to claim 11, wherein receiving the DCI from the network device based on the first information comprises:

receiving the DCI from the network device based on the first information within a valid time.

16. The apparatus according to claim 15, wherein the valid time is determined based on valid time indication information from the network device.

17. The apparatus according to claim 16, wherein the valid time indication information indicates at least one of a periodicity, duration, or an initial offset; and wherein the periodicity is a periodicity of the valid time, the duration is duration of the valid time in one period, and the initial offset is an offset between a start moment of the valid time in one period and a start moment of the period to which the valid time belongs.

18. The apparatus according to claim 11, wherein:

when the first information indicates the fourth transmission direction state, the DCI in the second format does not comprise a DCI format indicator field.

19. An apparatus, wherein the apparatus is a network device or a chip in the network device, and the apparatus comprises:

at least one processor; and a non-transitory computer-readable storage medium storing instructions that are executable by the at least one processor, the instructions including instructions for:

sending first information to a terminal device, wherein the first information indicates transmission direction information or service load information; and sending downlink control information (DCI) from the network device based on the first information;

wherein the transmission direction information indicates at least one of the following:

a first transmission direction state, indicating that a size of DCI in a second format is aligned with a size of DCI in a first format;

a second transmission direction state, indicating to the terminal device to receive only the DCI in the first format;

a third transmission direction state, indicating that the size of the DCI in the first format is aligned with the size of the DCI in the second format;

a fourth transmission direction state, indicating to the terminal device to receive only the DCI in the second format; or a default transmission direction state, indicating to the terminal device to receive the DCI in the first format and the DCI in the second format; and wherein the DCI in the first format is DCI that schedules an uplink transmission, and the DCI in the second format is DCI that schedules a downlink transmission; and wherein alignment methods comprise zero padding and truncation.

\* \* \* \* \*